United States Patent [19]

Murakami

[11] Patent Number: 5,740,305

[45] Date of Patent: Apr. 14, 1998

[54] APPARATUS FOR CODING AND DECODING EDITED INFORMATION DATA

[75] Inventor: Yoshihiro Murakami, Kanagawa, Japan

[73] Assignee: Sony Corporation, Tokyo, Japan

[21] Appl. No.: 570,977

[22] Filed: Dec. 12, 1995

[30] Foreign Application Priority Data

Dec. 12, 1994 [JP] Japan .................................. 6-307714

[51] Int. Cl.$^6$ ........................................................ H04N 5/92
[52] U.S. Cl. ............................................. 386/52; 386/111
[58] Field of Search ........................... 386/46, 52, 55, 386/109, 110, 111, 112, 124; H04N 5/92, 5/76

[56] References Cited

U.S. PATENT DOCUMENTS 5,191,436  3/1993  Yonemitsu .................................. 386/52
5,521,898  5/1996  Ogasawara .................................. 386/112

Primary Examiner—Thai Tran
Assistant Examiner—Huy Nguyen
Attorney, Agent, or Firm—William S. Frommer; Alvin Sinderbrand

[57] ABSTRACT

An apparatus for coding and/or decoding information data can edit information data at the compression unit by use of a high-efficiency two-way motion compensation predictive system. A motion compensation processing circuit (1) includes one-way predicting circuit (first motion compensating circuit (14)) for motion-compensation-predicting video data (Dv) based on frame information just behind the video data (Dv), two-way predicting circuit (first and second motion compensating circuits (14), (15) and an adder (16)) for motion-compensation-predicting the video data (Dv) based on frame information immediately-preceding and immediately-succeeding the video data (Dv) and a first switching circuit (17) for selectively switching one-way motion compensation predictive data (Dsr) supplied thereto from the one-way predicting circuit (14) and two-way motion compensating data (Dt) supplied thereto from the two-way predicting circuit (14, 15, 16) based on edit information (Sh) supplied thereto through an input terminal (φe). A data compression processing circuit (2) includes a synthesizing circuit for synthesizing coded data (dv) with motion vector data (v1 and v2) and the edit information (Sh).

10 Claims, 16 Drawing Sheets

APPARATUS FOR CODING AND DECODING EDITED INFORMATION DATA

BACKGROUND OF THE INVENTION

The present invention relates to apparatus for and method of coding and/or decoding information data in which image information is compressed by a motion compensation predicting system and recorded on a recording medium such as a magnetic tape and in which compressed information read out from the recording medium is decoded by a motion compensation predictive decoding system to restore original image information.

In general, a moving picture recorded in television broadcasting or VCR is treated as a string of consecutive still pictures. The NTSC broadcasting, for example, can provide a moving picture by continuously transmitting 29.97 still pictures (one still picture is referred to as a frame) per second.

A time interval of frame is as short as about 0.03 second and a correlation between preceding and succeeding frames is remarkably high. Therefore, when a moving picture is compressed, if the moving picture is compressed by a combination of intraframe-coding system and interframe-coding system, then a compression efficiency can be raised considerably. A coding system, provided by a combination of the intraframe-coding system and the interframe-coding system is often referred to as a hybrid coding system.

A fundamental interframe-coding system and a motion compensated interframe-coding system with a high coding efficiency are available as the hybrid coding system.

The interframe-coding system should process a moving picture at the unit of frames because of its arrangement and therefore the hardware of interframe-coding system such as a frame memory becomes large in scale and a coding delay time increases. To obviate the above disadvantages, a predictive coding system is frequently used at present because it is a relatively simple coding system.

The simplest prediction function in the predictive coding system is an interframe-predictive-coding calculating a difference between pixels located at corresponding positions of two frames, similarly to the intraframe-predictive coding system. This interframe-predictive-coding system is used in CCIR Recommendation 723. If the number of frames used in prediction increases, then a prediction efficiency can be raised. This is also true in the case of the intraframe-predictive-coding system. However, the interframe-predictive-coding system also cannot avoid disadvantages such as increased cost and increased delay time. For this reason, the number of frames used in prediction is practically 2 frames at maximum and contiguous 2 frames are used in the MPEG (moving pictures expert group) system.

The interframe-coding method is not limited to the above predictive-coding. Although it has been examined to use various coding techniques such as transform coding and sub-band coding, a large number of frames should be used in order to raise a coding efficiency and the factors such as delay time and cost cannot be neglected. Therefore, the following motion compensated frame predictive coding is employed mainly.

When a moving picture contains a high-speed moving object, if a difference between the frames is simply calculated, then corresponding points are displaced considerably between contiguous frames and a prediction accuracy cannot be raised. Accordingly, if a motion of a moving object is detected by comparing contiguous frames and the next frame is predicted after the object in the preceding frame has been shifted by a moved amount of the object, then a prediction error can be reduced and a compression efficiency can be raised. This operation is referred to as a motion compensation.

Although there are now available various motion detecting methods such as a motion detecting method for detecting a motion of moving image by checking a time space slope of luminance or a method for detecting a motion of moving picture by checking a phase based on Fourier transform, a block matching method is widespread as the motion detecting method because it is high in cost performance. U.S. Pat. No. 4,897,720 describes a block matching method, for example.

According to the block matching method, an image is divided into small blocks. A position of target block in the preceding frame is searched by examining a sum of absolute values of differences between pixels. Assuming now that a block size is N pixels and that a searching range is M pixels, then M ×N additions and subtractions are required per block, increasing a calculation cost. To solve the above problem, a high speed means such as hierarchical search or predictive search are proposed. A motion amount is sent to the decoding side as a motion vector.

In the case of compression coding using a motion compensated prediction wherein moving image data can be edited at the unit of two frames, if compressed data is not closed at the unit of two frames, then an original image cannot be decoded upon edit. Therefore, of image data of two frames, one image data is intraframe-coded and the other image data is coded by a motion compensated predictive coding from the frame of the intraframe-coded image data.

In order that coded image data can be edited, a motion compensated prediction becomes a motion compensated prediction (one-way prediction) for predicting an immediately-preceding frame or immediately-succeeding frame of the frame to be intraframe-coded. Therefore, as compared with a motion compensated prediction (two-way prediction) for predicting contiguous frames of the frame to be intraframe-coded, the one-way motion compensated prediction becomes disadvantageous from a coding efficiency standpoint.

SUMMARY OF THE INVENTION

In view of the aforesaid object, it is an object of the present invention to provide apparatus for and method of coding and/or decoding information data in which information data can be edited at the compression unit using a two-way motion compensated prediction system with a high efficiency.

A motion compensating means detects motion vector data relative to input information. At that time, a motion compensation prediction is selectively switched to a one-way prediction motion compensation or a two-way prediction motion compensation based on edit information supplied from edit information input means. If content of the input information is changed from somewhere thereof (input information with substantially no correlation with previous input information) due to assemble mode edit or insert mode edit, when such information is input to the motion compensating means, the two-way prediction motion compensation is switched to the one-way prediction motion compensation based on edit information (e.g., information indicating assemble mode edit or information indicating insert mode edit) and the motion compensating means compensates motion based on the one-way prediction with a relatively low efficiency.

When input information other than the cue is input to the motion compensating means, the content of the edit information indicates that the current input information is not the cue. Therefore, in this case, the one-way prediction motion compensation is switched to the two-way prediction motion compensation with a high efficiency.

The input information whose motion is compensated by the motion compensating means on the basis of the one-way prediction or the two-way prediction is output from the motion compensating means as motion compensated information. The motion compensated information is supplied to a succeeding predictive error detecting means, in which a predictive error between it and the input information is detected.

The predictive error information and the input information from the predictive error detecting means are coded by a succeeding coding processing means as interframe-coded information and intraframe-coded information. The coding processing means adds the motion vector information and the edit information to coded information composed of the interframe-coded information and the intraframe-coded information.

According to the present invention, since the motion compensation prediction is switched to the one-way prediction and the two-way prediction on the basis of the edit information such as information indicative of cue, the input information corresponding to the cue with substantially no correlation between the frames is motion-compensated by the one-way prediction motion compensation. Information with high correlation between the frames are motion-compensated by the two-way prediction motion compensation with a high coding efficiency.

To raise a coding efficiency, it is proposed to perform a two-way prediction motion compensation with a high coding efficiency uniformly. When information data of frames with substantially no correlation such as cue are motion-compensated, it takes plenty of time to obtain the motion vector information. Further, information data of frames have substantially no correlation therebetween, even when the motion vector data are obtained, effect based on motion compensation (effect for raising coding efficiency) cannot be achieved remarkably.

However, according to the present invention, as described above, information data of frames with substantially no correlation are not motion-compensated and only information data with a high correlation can be motion-compensated. Furthermore, sine the two-way prediction with a high coding efficiency is carried out, moving image data can be edited at the compression unit by use of the two-way motion compensation prediction system with high efficiency.

The motion compensating means detects motion vector data relative to input information. At that time, the one-way predicting means motion-compensation-predicts the input information from immediately-succeeding frame information. The two-way predicting means motion-compensation-predict the input information from contiguous frame information.

A motion compensation information switching means selectively switches motion compensation information supplied thereto from the one-way predicting means and motion compensation information supplied thereto from the two-way predicting means based on the edit information supplied thereto from the edit information input means. The motion compensation information (motion compensation information from the one-way predicting means or motion compensation information from the two-way predicting means) from the motion compensation information switching means is supplied to the succeeding prediction error detecting means, in which predictive error between it and the input information is detected.

The predictive error information and the input information from the prediction error detecting means are coded by the coding processing means as interframe-coded information and intraframe-coded information. The coding processing means adds the motion vector data detected by the motion compensating means and the edit information to coded information composed of the interframe-coded information and the intraframe-coded information.

According to the present invention, since the motion compensation prediction is switched to the one-way prediction or the two-way prediction based on the edit information such as the information indicating the cue, the input information data corresponding to the cues with substantially no correlation between the frames are motion-compensated by the one-way prediction motion compensation. Information data with high correlation between the frames are motion-compensated by the two-way prediction motion compensation with high coding efficiency. As a result, moving image data can be edited at the compression unit by use of the two-way motion compensation prediction system with high efficiency.

The motion compensation information (motion compensation information from the one-way predicting means or motion compensation information from the two-way predicting means) from the motion compensation information switching means is supplied to the prediction error detecting means. The prediction error detecting means detects a prediction error between the motion compensation information and the input information.

The prediction error information from the prediction error detecting means and the input information are compressed and coded by coding means in the coding processing means as interframe-coded information and intraframe-coded information. The coded information from the coding means is supplied to a succeeding information adding means. The information adding means adds the coded information with the motion vector data detected by the motion compensating means and the edit information.

As described above, since the information adding means adds the motion vector data and the edit information to the coded information, the decoding side can decode information data by use of the edit information. Therefore, it can easily be determined whether the transmitted coded information is motion-compensated by the one-way prediction motion compensation or the two-way prediction motion compensation. Thus, the coded information can be restored to the input information reliably.

An information extracting means extracts the motion vector data and the edit information from compressed information containing the intraframe-coded information and the prediction error information. A decoding processing means decodes the compressed information and the decoding processing means generates intraframe-coded reproduced information and prediction error reproduced information.

A motion compensating means motion-compensates the prediction error reproduced information by the one-way prediction motion compensation or the two-way prediction motion compensation based on intraframe-coded reproduced information supplied thereto from the decoding means and the motion vector data supplied thereto from the information extracting means.

At that time, the one-way prediction motion compensation and the two-way prediction motion compensation are switched based on the edit information supplied from the information extracting means. If coded information is changed into the intraframe-coded information concerning input information whose content is changed in somewhere due to assemble mode edit or insert mode edit executed on the coding side (with substantially no correlation with previous prediction error reproduced information), when the intraframe-coded reproduced information (corresponding to the cue) is input to the motion compensating means, a motion compensation prediction is switched to the one-way prediction by the edit information (e.g., information indicating assemble mode edit or information indicating insert mode edit). Then, the motion compensating means motion-compensates moving image data based on the one-way prediction motion compensation with a relatively low efficiency.

When intraframe-coded reproduced information concerning input information other than the cue is input to the motion compensating means, the content of the edit information indicates that the current intraframe-coded reproduced information is not the cue. Therefore, in this case, the motion compensating means switches the one-way prediction motion compensation to the two-way prediction motion compensation.

Interframe-coded reproduced information is obtained on the basis of the motion compensation information from the motion compensating means and the prediction error reproduced information. An input reproduced information output means generates input reproduced information in which the interframe-coded reproduced information and the intraframe-coded reproduced information are output alternately.

As described above, since the motion compensation prediction is switched to the one-way prediction and the two-way prediction on the basis of the edit information such as the information indicating the cue, the intraframe-coded reproduced information corresponding to the cue with substantially no correlation with immediately-preceding frame can be motion-compensated by the one-way prediction motion compensation. Information data with a high correlation between the frames can be motion-compensated by the two-way prediction compensation with a low coding efficiency. Specifically, the information decoding apparatus corresponding to the above-mentioned information coding apparatus can be obtained and the compressed information in which information data is edited at the compression unit can be decoded with high efficiency.

The information extracting means extracts the motion vector data and the edit information from the compressed information containing the intraframe-coded information and the prediction error information. The decoding processing means decodes the compressed information and the decoding means generates the intraframe-coded reproduced information and the prediction error reproduced information.

A one-way predicting means in the motion compensating means motion-compensation-predicts the prediction error reproduced information from the immediately-succeeding intraframe-coded reproduced information. Two-way predicting means motion-compensation-predict the prediction error reproduced information from the contiguous intraframe-coded reproduced information.

A motion compensation switching means switches motion compensation information supplied thereto from the one-way predicting means and motion compensation information supplied thereto from the two-way predicting means on the basis of the edit information supplied thereto from the information extracting means. Interframe-coded reproduced information is obtained on the basis of motion compensation information (motion compensation information from the one-way predicting means or motion compensation information from the two-way predicting means) from the motion compensation switching means. The input reproduced information output means generates input reproduced information wherein the interframe-coded reproduced information and the intraframe-coded reproduced information are output alternately.

Since the motion compensation prediction is switched to the one-way prediction and the two-way prediction on the basis of the edit information such as the information indicating the cue, the intraframe-coded reproduced information corresponding to the edit with substantially no correlation with the immediately-preceding frame can be motion-compensated by one-way prediction motion compensation. Information data with high correlation between the frames can be motion-compensated by the two-way motion compensation with high coding efficiency. Therefore, the information decoding apparatus corresponding to the above-mentioned information coding apparatus can be obtained. Thus, compressed information in which information data are edited at the compression unit can be decoded with high efficiency.

DETAILED DESCRIPTION OF THE PREFERRED EMBODIMENT

An embodiment wherein an apparatus for coding and/or decoding information data according to the present invention is applied to a digital VCR will be described with reference to FIGS. 1 through 16.

Figure 1:
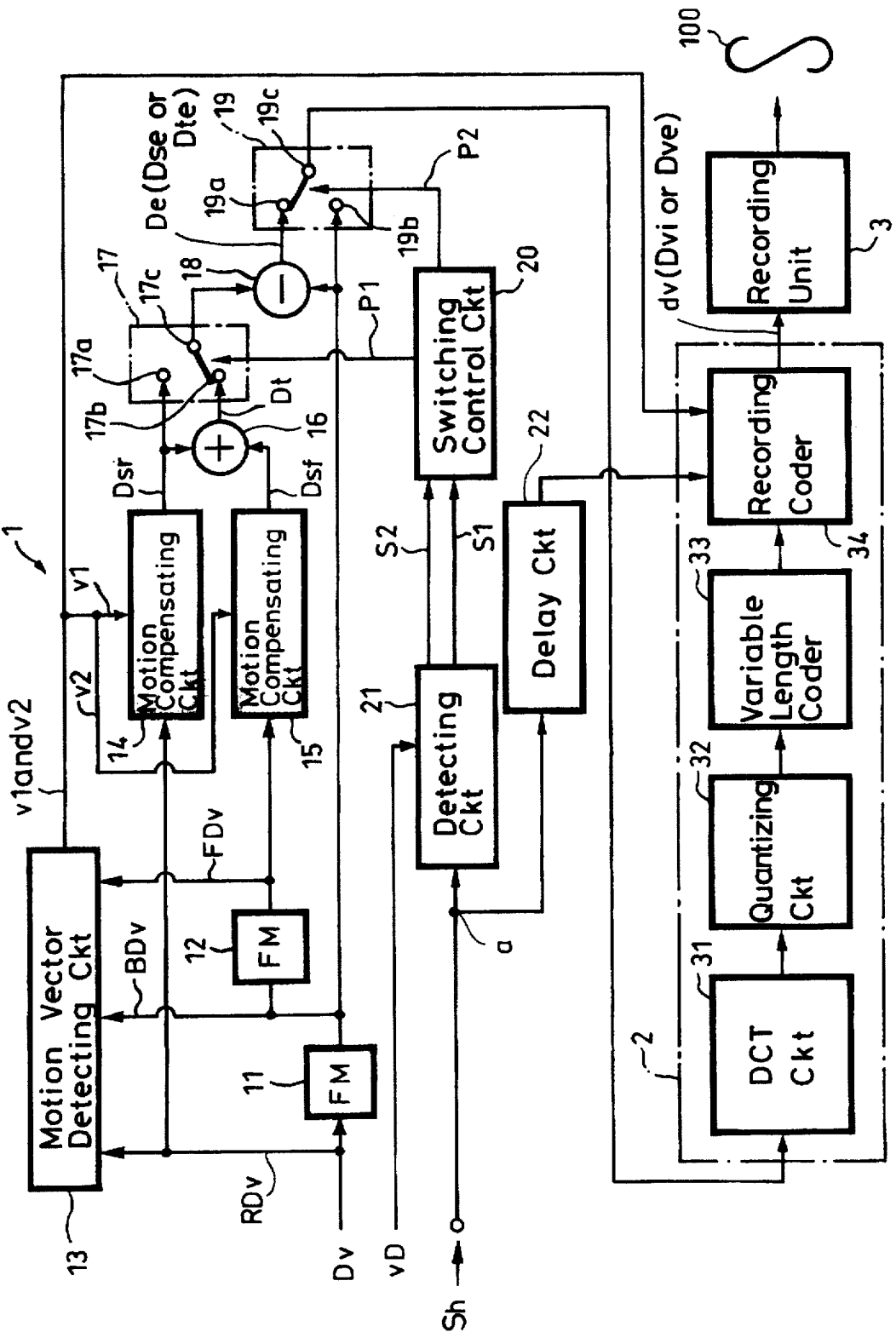
FIG. 1 is a block diagram showing an apparatus for coding information data which is applied to a digital VCR.

FIG. 1 of the accompanying drawings shows, in block form, an apparatus for coding information data according to the present invention.

As shown in FIG. 1, the coding apparatus compresses digital component video data (Y, R-Y, B-Y: hereinafter simply referred to as video data) Dv, codes the compressed video data for recording and records the coded video data on a recording medium such as a magnetic tape as coded data.

As shown in FIG. 1, the coding apparatus includes a motion compensation processing circuit 1 for selectively motion-compensating the input video data Dv in a one-way or two-way predictive motion compensation fashion, a data compression processing circuit 2 for compressing predictive error data De (Dse or Dte) and the video data Dv supplied thereto from the motion compensation processing circuit 1 and a recording unit 3 for converting the coded data dv output thereto from the data compression processing circuit 2 in the form suitable for being recorded on a magnetic tape 100 and recording the converted coded data dv on the magnetic tape 100.

The motion compensation processing circuit 1 includes a first frame memory (FM) 11 for holding input video data Dv of one frame during one-frame period and a second frame memory (FM) 12 for holding video data BDv delayed by a delay time of one frame output from the first frame memory 11 during one-frame period.

The frame memories 11, 12 convert the input video data Dv into three parallel data each having a time difference of one frame. Considering the video data Dv output from the first frame memory 11 as reference video data BDv, video data output from the second frame memory 12 is one-frame-preceding video data with respect to the reference video data BDv. This video data will be referred to as one-frame-preceding data FDv. Video data input to the first frame memory 11 is one-frame-succeeding video data with respect to the reference video data BDv. This video data will be referred to as one-frame-succeeding video data Rdv.

The motion compensation processing circuit 1 includes a motion vector detecting circuit 13 for detecting motion vector data (first motion vector data) v1 of the one-frame-succeeding data RDv relative to the reference video data BDv from the reference video data Bdv and the one-frame-succeeding data RDv and motion vector data (second motion vector data) v2 of the one-frame-preceding data FDv relative to the reference video data BDv from the reference video data BDv and the one-frame-preceding data FDv, a first motion compensating circuit 14 for motion-compensating the reference video data BDv by moving an image indicated by the one-frame-succeeding data RDv by a moving amount indicated by the first motion vector data v1 supplied thereto from the motion vector detecting circuit 13 and a second motion compensating circuit 15 for motion-compensating the reference video data BDv by moving an image indicated by the one-frame-preceding data FDv by a moving amount indicated by the second motion vector data v2.

Data output from the first motion compensating circuit 14 is a one-way motion-compensated predictive data Dsr provided between the reference frame and an immediately-succeeding frame. Data output from the second motion compensating circuit 15 is a one-way motion-compensated predictive data Dsf provided between the reference frame and an immediately-preceding frame.

The motion vector detecting circuit 13 uses a block matching method based on 8×8 blocks, for example.

The first and second motion compensating circuits 14 and 15 are followed by an adder 16. The adder 16 is adapted to add the motion-compensated predictive data Dsr supplied thereto from the first motion compensating circuit 14 and the motion-compensated predictive data Dsf supplied thereto from the second motion compensating circuit 15. Therefore, data output from the adder 16 is data indicative of an average value of the one-way motion-compensated predictive data Dsr and Dsf output from the first and second motion compensating circuits 14 and 15. This data is a two-way motion-compensated predictive data Dt which takes into consideration the preceding and succeeding frames with reference to the reference frame.

The adder 16 is connected with a first switching circuit 17 and a subtracter 18. The first switching circuit 17 selectively switches the one-way motion-compensated predictive data Dsr supplied thereto from the first motion compensating circuit 14 and the two-way motion-compensated predictive data Dt supplied thereto from the adder 16. The subtracter 18 outputs predictive error data De (Dse or Dte) of the reference video data BDv by subtracting the one-way motion-compensated predictive data Dsr or the two-way motion-compensated predictive data Dt supplied thereto from the first switching circuit 17 from the reference video data BDv output from the first frame memory 11.

The subtracter 18 is connected with a second switching circuit 19. The second switching circuit 19 selectively switches the reference video data BDv supplied thereto from the first frame memory 11 and the predictive error data De supplied thereto from the subtracter 18.

The first switching circuit 17 is composed of a first fixed contact 17a connected to the output side of the first motion compensating circuit 14, a second fixed contact 17b connected to the output side of the adder 16 and a movable contact 17c connected to one input side of the subtracter 18. The second switching circuit 19 is composed of a first fixed contact 19a connected to the output side of the subtracter 18, a second fixed contact 19b connected to the output side of the first frame memory 11 and a movable contact 19c connected to the input side of the data compression processing circuit 2.

The motion compensation processing circuit 1 is connected with an input terminal φe to which edit information Sh is supplied. The edit information Sh supplied to the input terminal φe is information indicating that a current frame is an edit-in IN and/or edit-out OUT in an assemble mode edit or an insert mode edit, for example. The edit information Sh is supplied from a system controller as code data by operating assemble mode edit operation keys or insert mode edit operation keys provided on a console.

The input terminal φe is connected with a detecting circuit 21. The detecting circuit 21 detects a start of edit-in in the assemble mode edit and a start of edit-in IN and an termination of an edit-out OUT in the insert mode edit to thereby output a first detecting signal S1 to a switching control circuit 20, which will be described later on. Further, the detecting circuit 21 outputs a second detecting signal S2 to the switching control circuit 20 in synchronism with a vertical sync (synchronizing) signal VD supplied thereto from a synchronizing separating circuit (not shown).

The first and second switching circuits 17, 19 selectively connect the movable contacts 17c, 19c to the fixed contacts 17a, 19a or 17b, 19b in response to control signals P1 and P2 supplied thereto from the switching control circuit 20.

In response to the first detecting signal S1 supplied thereto from the detecting circuit 21 when the edit information Sh is detected, the switching control circuit 20 supplies the first control signal P1 to the first switching circuit 17 so that the first switching circuit 17 connects the movable contact 17c to the first fixed contact 17a during two-frame period. Also, the switching control circuit 20 supplies the second control signal P2 to the second switching circuit 19 so that the second switching circuit 19 connects the movable contact 19c to the second fixed contact 19b during one-frame period.

In response to the second detecting signal S2 obtained from the detecting circuit 21 when the vertical sync signal VD is detected, the switching control circuit 20 supplies the second control signal P2 to the second switching circuit 19 so that the second switching circuit 19 connects the movable contact 19c to the first or second fixed contact 19a or 19b during one-frame period.

In general, the first switching circuit 17 electrically connects the movable contact 17c to the second fixed contact 17b under control of the switching control circuit 20.

The data compression processing circuit 2 includes a DCT (discrete cosine transform) circuit 31 for discrete-cosine-transforming the predictive error data De (Dse or Dte) or the reference video data BDv supplied thereto from the second switching circuit 19, a quantizing circuit 32 for re-quantizing coefficient data output thereto from the DCT circuit 31, a variable length coder 33 for variable-length-coding data indicative of the quantization level from the quantizing circuit 32 for compressing data, and a recording-coder 34 for record-coding the variable-length-coded data supplied thereto from the variable length coder 33.

The data compression processing circuit 2 effects a compression processing (interframe-coding) on the predictive error data De output thereto from the second switching circuit 19 to provide interframe-coded data dve. The data compression processing circuit 2 effects a compression processing (intraframe-coding) on the reference video data BDv output thereto from the second switching circuit 19 to provide intraframe-coded data dvi.

Although not shown, the recording-coder 34 includes a synthesizing circuit for synthesizing the variable-length-coded data from the variable length coder 33 in the data compression processing circuit 2 with the motion vector data v1, v2 supplied thereto from the motion vector detecting circuit 13 and the edit information Sh supplied thereto from the input terminal φe and an ECC (error correction code) encoder for blocking the data from the synthesizing circuit such that the above data has an ECC product code configuration. Further, the ECC coder adds an outer parity code and an inner parity code to the data thus blocked.

A delay circuit 22 for delaying data by a delay time of one-frame period is connected between the input terminal φe and the synthesizing circuit in the recording-coder 34, to be concrete, a branching point a to the detecting circuit 21 and the synthesizing circuit of the signal line extending from the input terminal φe to the synthesizing circuit in the recording-coder 34. As a consequence, the edit information Sh input to the input terminal φe is delayed by a delay time of one-frame period and synthesized with the coded data dv by the synthesizing circuit.

Although not shown, the recording unit 3 includes a channel encoder for converting data with parity codes added thereto into serial data, an amplifier for amplifying the serial data output thereto from the channel encoder and a recording magnetic head for magnetically recording the serial data amplified by the amplifier on the magnetic tape 100 in a helical scan system, for example.

Figure 2:
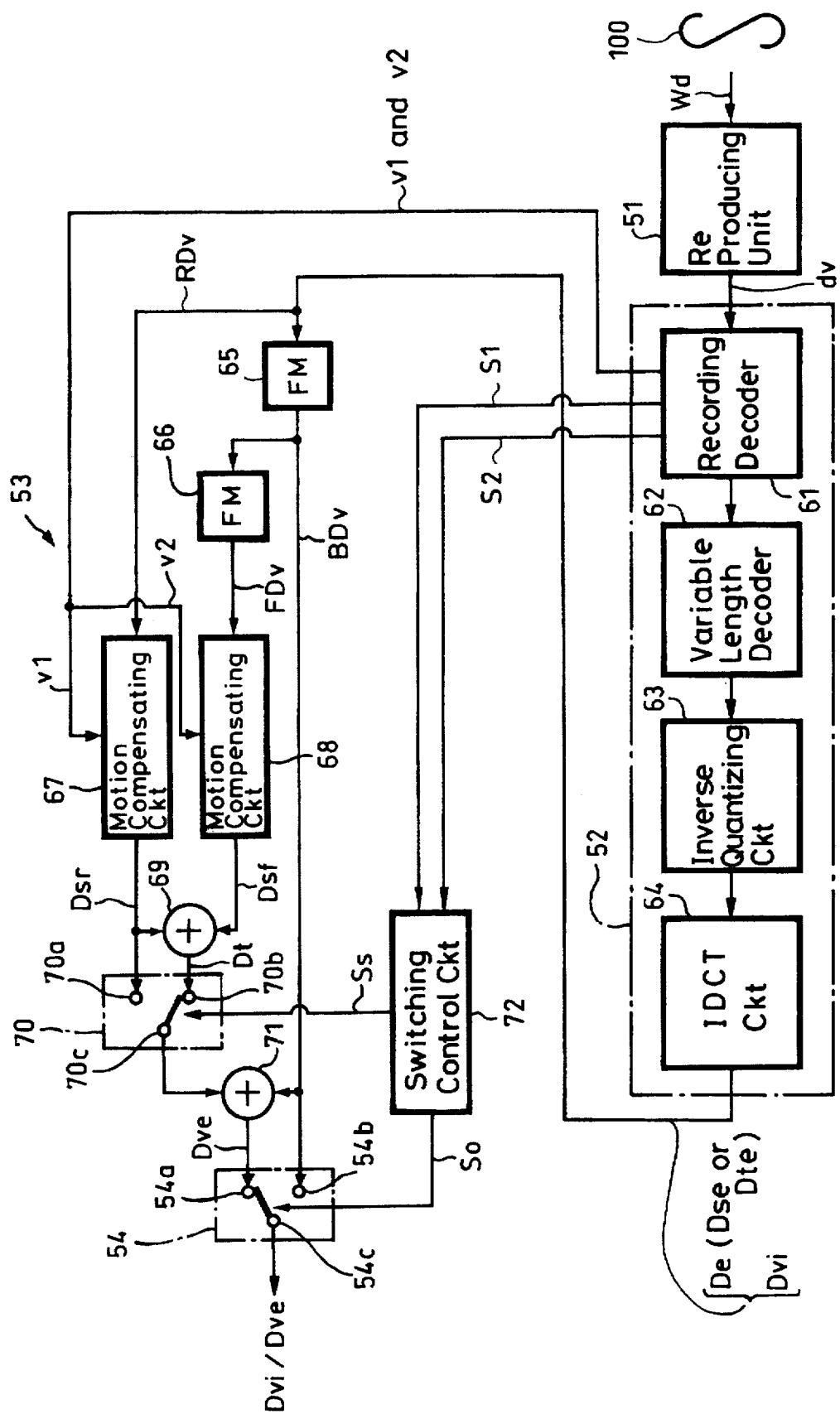
FIG. 2 is a block diagram showing an apparatus for decoding information data which is applied to a digital VCR.

FIG. 2 shows, in block form, an apparatus for decoding information data according to the present invention.

As shown in FIG. 2, the decoding apparatus includes a reproducing unit 51 for playing back recorded data Wd magnetically recorded on the magnetic tape 100 and converting the reproduced recorded data Wd into the signal form (reproduced data: coded data dv containing interframe-coded data dve and intraframe-coded data dvi) suitable for the later decoding processing, a data expanding processing circuit 52 for data-expanding (error-correcting and data-decoding) the reproduced data dv supplied thereto from the reproducing unit 51 to provide data, which are not yet compressed, i.e., the predictive error reproduced data De (Dse or Dte) and the intraframe-coded reproduced data Dvi, a motion compensation processing circuit 53 for selectively motion-compensating the predictive error reproduced data De supplied thereto from the data expanding processing circuit 52 in a one-way or two-way motion compensation prediction fashion to provide interframe-coded reproduced data (reproduced video data) Dve and an output circuit 54 for sequentially outputting the intraframe-coded reproduced data (reproduced video data) Dvi and the interframe-coded reproduced data (reproduced video data) Dve.

Although not shown, the reproducing unit 51 includes a playback magnetic head for reproducing the data Wd magnetically recorded on the magnetic tape 100 as serial data, an amplifier for amplifying the serial data supplied thereto from the playback magnetic head and a channel decoder for detecting the serial data amplified by the amplifier and converting the detected data in the form of serial to parallel data.

The data expanding processing circuit 52 includes a recording-decoder 61 for record-decoding parallel data supplied thereto from the channel decoder in the reproducing unit 51, a variable length decoder 62 for variable-length-decoding decoded data supplied thereto from the recording-decoder 61, an inverse quantizing circuit 63 for inverse-quantizing the quantization level data supplied thereto from the variable length decoder 62 to provide coefficient data, and an inverse discrete cosine transform (IDCT) circuit 64 for inverse-discrete-cosine-transforming the coefficient data supplied thereto from the inverse quantizing circuit 63 to provide block data composed of 8×8 blocks.

The recording-decoder 61 in the data expanding processing circuit 52 includes an ECC decoder for error-correcting data based on the inner parity code and the outer parity code added to the parallel data supplied thereto from the channel decoder in the reproducing unit 51 and which analyzes the error-corrected data at the word unit of the variable length code and a detecting circuit for detecting the motion vector data v1, v2 contained in the data supplied thereto from the ECC decoder, the edit information and the vertical sync signal Vd, although not shown.

The detecting circuit outputs a first detecting signal S1 to a switching control circuit 72, which will be described later on, when the edit-in and edit-out in the assemble mode edit are detected and the detection of edit-in IN and edit-out OUT in the insert mode edit is finished. Further, the detecting circuit outputs a second detecting signal S2 to the switching control circuit 72 based on the detection of the vertical sync signal VD.

As shown in FIG. 2, the motion compensation processing circuit 53 includes a first frame memory (FM) 65 for holding coded reproduced data (predictive error reproduced data De or intraframe-coded reproduced data Dvi) of one frame supplied thereto from the data expanding processing circuit 52 during one-frame period and a second frame memory (FM) 66 for further holding coded reproduced data De or Dvi delayed by a delay time of one-frame period output from the first frame memory 65 during one-frame period.

Specifically, considering the coded reproduced data BDv output from the first frame memory 65 as reference data, coded reproduced data output from the second frame memory 66 is one-frame-preceding coded reproduced data (hereinafter referred to as one-frame-preceding data FDv) with respect to the reference coded reproduced data BDv. The coded reproduced data input to the first frame memory 65 becomes a one-frame-succeeding coded reproduced data (hereinafter referred to as one-frame-succeeding data RDv) with respect to the reference coded reproduced data BDv.

Therefore, if the reference coded reproduced data BDv output from the first frame memory 65 is intraframe-coded reproduced data Dvi concerning nth frame, for example, when the reference coded reproduced data BDv intends a two-way prediction, the one-frame-preceding data FDv becomes two-way predictive error reproduced data Dte concerning motion-compensation prediction provided between (n−2)th frame and (n−1)th frame and a motion-compensation prediction provided between (n−1)th frame and nth frame. The one-frame-succeeding data RDv becomes a two-way predictive error reproduced data DTe concerning a motion-compensation prediction provided between nth frame and (n+1)th frame and a motion-compensation prediction provided between the (n+1)th frame and (n+2)th frame.

If the reference coded reproduced data BDv output from the first frame memory 65 intends the two-way prediction and is the two-way predictive error reproduced data Dte concerning the motion-compensation prediction provided between the (n−2)th frame and the (n−1)th frame and a motion-compensation prediction provided between the (n−1)th frame and nth frame, then the one-frame-preceding data FDv is the intraframe-coded reproduced data Dvi concerning the (n−2)th frame and the one-frame-succeeding data RDv is the intraframe-coded reproduced data Dvi concerning the nth frame.

The motion compensation processing circuit 53 includes a first motion compensating circuit 67 for motion-compensating the one-frame-succeeding data RDv supplied thereto from the data expanding processing circuit 52 based on the motion vector data v1 detected by the detecting circuit in the recording-decoder 61 and a second motion compensating circuit 68 for motion-compensating the one-frame-preceding data FDv supplied thereto from the second frame memory 66 based on the motion vector data v2 detected by the above detecting circuit.

The first motion compensating circuit 67 motion-compensates the (n−1)th frame by moving the one-frame-succeeding data RDv by a moving amount indicated by the motion vector data v1 supplied thereto from the detecting circuit if the one-frame-succeeding data RDv is the intraframe-coded reproduced data Dvi concerning the nth frame, for example. The second motion compensating circuit 68 motion-compensates the (n−1)th frame by moving the one-frame-preceding data FDv by a moving amount indicated by the motion vector data v2 supplied thereto from the detecting circuit if the one-frame-preceding data FDv is the intraframe-coded reproduced data Dvi concerning the (n−2)th frame, for example.

Specifically, the data output from the first motion compensating circuit 67 is one-way motion compensation predictive data Dsr provided between two frames of a frame to be motion-compensated and an immediately-succeeding frame. The data output from the second motion compensating circuit 68 is one-way motion compensation predictive data Dsf provided between two frames of a frame to be motion-compensated and an immediately-preceding frame.

The first and second motion compensating circuits 67 and 68 are connected with a first adder 69. The first adder 69 is adapted to add the motion compensation predictive data Dsr supplied thereto from the first motion compensating circuit 67 and the motion compensation predictive data Dsf supplied thereto from the second motion compensating circuit 68. As a consequence, data output from the first adder 69 is an average value of the one-way motion compensation predictive data Dsr and Dsf output from the first and second motion compensating circuits 67 and 68. This data is a two-way motion compensation predictive data Dt which takes into consideration the preceding and succeeding frames with respect to the reference frame to be motion-compensated.

The first adder 69 is connected with a switching circuit 70 and a second adder 71. The switching circuit 70 selectively switches the one-way motion compensation predictive data Dsr supplied thereto from the first motion compensating circuit 67 and the two-way motion compensating predictive data Dt supplied thereto from the first adder 69. The second adder 71 adds the predictive error reproduced data De (Dse or Dte) output from the first frame memory 65 and the one-way motion compensation predictive data Dsr or two-way motion compensation predictive data Dt supplied thereto from the switching circuit 70 to provide interframe-coded reproduced data (reproduced video data) Dve.

The switching circuit 70 includes a first fixed contact 70a connected to the output side of the first motion compensating circuit 67, the second fixed contact 70b connected to the output side of the first adder 69 and a movable contact 70c connected to one input side of the second adder 71. The output circuit 54 includes a first fixed contact 54a connected to the output side of the second adder 71, a second fixed contact 54b connected to the output side of the first frame memory 65 and a movable contact 54c connected to a signal processing system provided at the later stage.

The switching circuit 70 and the output circuit 54 selectively switch the movable contacts 70c and 54c in response to control signals Ss and So output from a switching control circuit 72. The switching control circuit 72 is responsive to the first detecting signal S1 obtained from the detecting circuit in the recording-decoder 61 when the detecting circuit detects the edit information Sh to supply the switching control signal Ss to the switching circuit 70 so that the switching circuit 70 is allowed to connect the movable contact 70c to the first fixed contact 70a during two-frame period. Also, the switching control circuit 72 is responsive to the second detecting signal S2 obtained from the detecting circuit when the detecting circuit detects the vertical sync signal VD to supply the output control signal So to the output circuit 54 so that the output circuit 54 is allowed to connect the movable contact 54c to the first or second fixed contact 54a or 54b during one-frame period.

A manner in which the coding apparatus and the decoding apparatus according to the present invention record and reproduce information data will be described with reference to FIGS. 3 and 4.

In the initial state, the first and second switching circuits 17, 19 electrically connect the movable contacts 17c, 19c to the second fixed contacts 17b, 19b, respectively.

Figure 3:
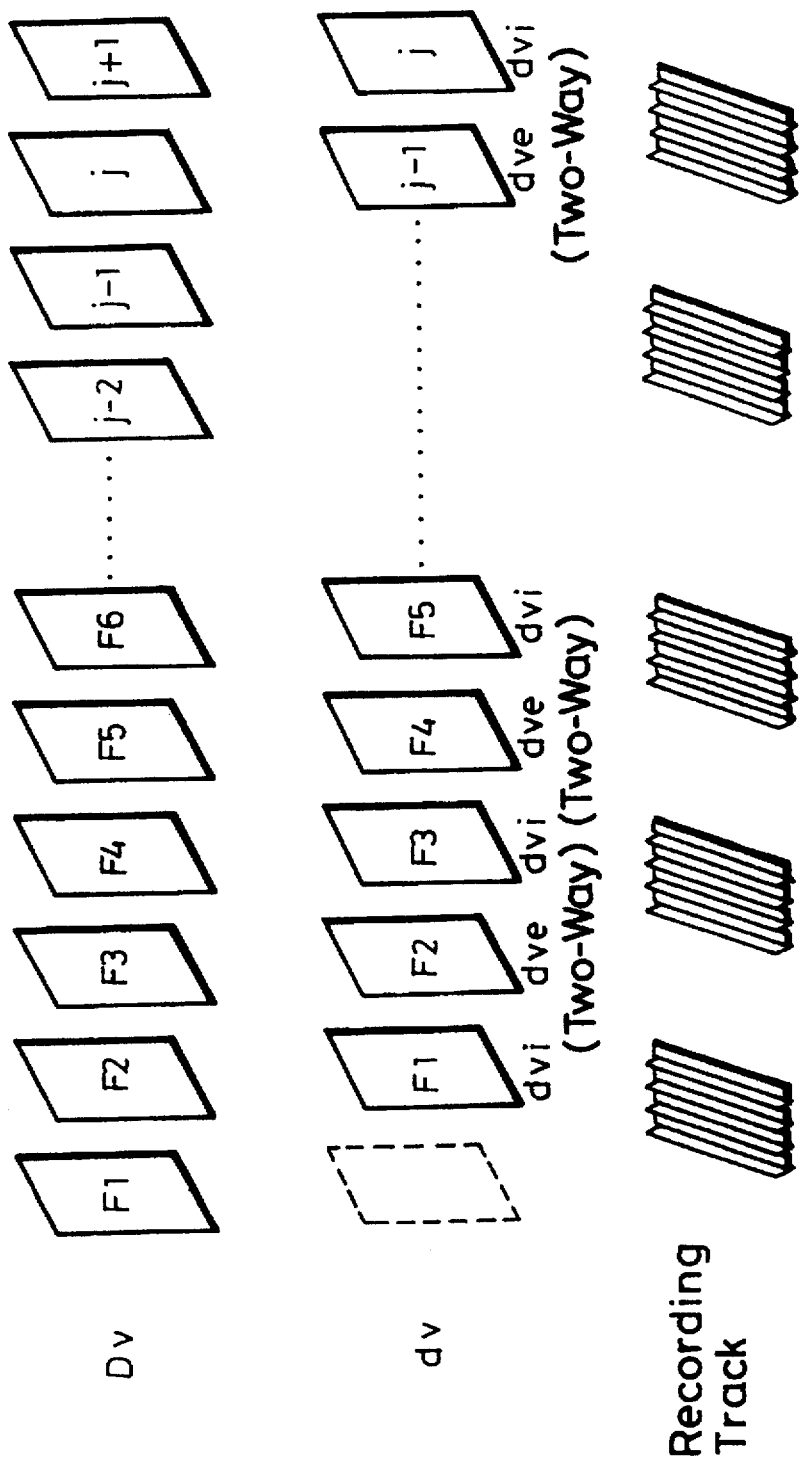
FIG. 3 is an explanatory diagram showing a normal processing executed by the apparatus for coding information data according to the present invention.

As shown in FIG. 3, at the stage that video data Dv of a first frame F1, for example, is input, initial data is input to the data compression processing circuit 2 from the first frame memory 11 and the recording unit 3 outputs invalid data (shown by phantom).

At the stage that video data of a second frame F2 is input, video data of the first frame F1 is input to the succeeding data compression processing circuit 2. Then, the data compression processing circuit 2 compresses and codes the video data Dv of the first frame F1 and the compressed and coded data is output from the recording unit 3 as intraframe-coded data dv1 concerning the first frame F1.

The above invalid data and the intraframe-coded data dvi concerning the first frame F1 are recorded on the magnetic tape 100 as eight helical tracks, for example.

At the stage that video data Dv of a third frame F3 is input, the switching control circuit 20 outputs the second control signal P2 on the basis of the vertical sync signal VD input thereto from the synchronizing separating circuit (not shown), whereby the switching circuit 19 connects the movable contact 19c to the first fixed contact 19a. Thus, the movable contact 19c and the first fixed contact 19a are electrically connected to each other.

At that time, the input video data Dv of the third frame F3, the video data Dv of the second frame F2 from the first frame memory 11 and the video data Dv of the first frame F1 from the second frame memory 12 are supplied to the motion detecting circuit 13. The motion detecting circuit 13 detects the motion vector data v1 and v2 based on the video data Dv of the second frame F2. To be more concrete, by a block matching method in which the second frame F2 is set to the current frame and the first frame F1 is set to the reference frame, the motion vector data v2 of the first frame F1 relative to the second frame F2 is detected. By a block matching method in which the second frame F2 is set to the current frame and the third frame F3 is set to the reference frame, the motion vector data v1 of the third frame F3 relative to the second frame F2 is detected.

The motion vector detecting circuit 13 detects the motion vector data v1, v2 with respect to the video data Dv of nth frame based on the respective video data of (n−1)th frame, nth frame and (n+1)th frame. Specifically, by a block matching method in which nth frame is set to the current frame and (n−1)th frame is set to the reference frame, the motion vector data (hereinafter referred to as second motion vector data) of (n−1)th frame relative to nth frame is detected. By a block matching method in which nth frame is set to the current frame and (n+1)th frame is set to the reference frame, the motion vector data (hereinafter referred to as first motion vector data) v1 of (n+1)th frame relative to the nth frame is detected.

The first motion compensating circuit 14 outputs first motion compensation predictive data Dsr by moving the video data Dv of the third frame F3 by a moving amount indicated by the first motion vector data v1. The second motion compensating circuit 15 outputs second motion compensation predictive data Dsf by moving the video data Dv of the first frame F1 by a moving amount indicated by the second motion vector data v2.

The motion compensation predictive data Dsr and Dsf are added by the succeeding adder 16. Then, the adder 16 outputs added data of the motion compensation predictive data Dsf of the first frame F1 relative to the second frame F2 and the motion compensation predictive data Dsr of the third frame F3 relative to the second frame F2, i.e., two-way motion compensation predictive data Dt. The two-way motion compensation predictive data Dt is supplied through the first switching circuit 17 (the movable contact 17c is constantly connected to the second fixed contact 17b because of normal processing) to the succeeding subtracter 18.

The subtracter 18 subtracts the video data Dv of the second frame F2 supplied thereto from the first frame memory 11 and the two-way motion compensation predictive data Dt supplied thereto from the adder 16 to provide two-way predictive error data Dte.

The two-way predictive error data Dte from the subtracter 18 is compressed and coded by the data compression processing circuit 2 and output from the recording unit 3 as interframe-coded data dve based on the second frame F2 (i.e., two-way predictive error data concerning the second frame F2).

At the stage that the video data Dv of the fourth frame F4 is input, the switching control circuit 20 outputs the control signal P2 based on the vertical sync signal VD input thereto from the synchronizing separating circuit, whereby the second switching circuit 19 connects the movable contact 19c to the second fixed contact 19b. Thus, the movable contact 19c and the second fixed contact 19b are electrically connected to each other. Therefore, the video data Dv of the third frame F3 is input to the data compression processing circuit 2, in which the video data Dv of the third frame F3 is compressed and coded and then output from the recording unit 3 as intraframe-coded data dvi concerning the third frame F3.

The interframe-coded data dve based on the second frame F2 and the intraframe-coded data dvi concerning the third frame F3 are recorded on the magnetic tape 100 as eight helical tracks, for example.

At that time, the motion vector data v1 and v2 from the motion vector detecting circuit 13 are synthesized with coded data dv by the synthesizing circuit in the recording-coder 34 and then output from the recording unit 3 at a timing in which the recording magnetic head in the recording unit 3 traces an auxiliary track or an auxiliary space of a video track on the magnetic tape 100. As a result, the motion vector data v1 and v2 are recorded on the auxiliary track or the above space on the magnetic tape 100.

Similarly, at the stage that video data of jth frame is input, the second switching circuit 19 connects the movable contact 19c to the first fixed contact 19a, whereby the input video data Dv of the jth frame, video data Dv of (j−1)th frame from the first frame memory 11 and video data Dv of (j−2)th frame from the second frame memory 12 are supplied to the motion vector detecting circuit 13. The motion vector detecting circuit 13 detects the motion vector data v1, v2 based on the video data dv of the (j−1)th frame.

The first motion compensating circuit 14 outputs first motion compensation predictive data Dsr by moving the video data Dv of the jth frame by a moving amount indicated by the first motion vector data v1. The second motion compensating circuit 15 outputs second motion compensation predictive data Dsf by moving the video data Dv of the (j−2)th frame by a moving amount indicated by the second motion vector data v2. The motion compensation predictive data Dsr and Dsf are supplied to and added by the adder 16. Then, the adder 16 outputs added data of the motion compensation predictive data Dsf of the (j−2)th frame relative to the (j−1)th frame and the motion compensation predictive data Dsr of the jth frame relative to the (j−1)th frame, i.e., two-way motion compensation predictive data Dt.

The two-way motion compensation predictive data Dt is supplied through the first switching circuit 17 to the subtracter 18. The subtracter 18 subtracts the video data Dv of the (j−1)th frame supplied thereto from the first frame memory 11 and the two-way motion compensation predictive data Dt supplied thereto from the adder 16 to provide two-way predictive error data Dte concerning the (j−1)th frame.

The two-way predictive error data Dte from the subtracter 18 is compressed and coded by the data compression processing circuit 2 and output from the recording unit 3 as interframe-coded data dve based on the (j−1)th frame.

At the stage that video data Dv of (j+1)th frame is input, the switching control circuit 20 outputs the second control signal P2 in synchronism with the vertical sync signal VD input thereto from the synchronizing separating circuit, whereby the second switching circuit 19 connects the movable contact 19c to the second fixed contact 19b. Thus, the movable contact 19c and the second fixed contact 19b are electrically connected to each other. As a consequence, video data Dv of the jth frame is input to the data compression processing circuit 2, in which the video data Dv of the jth frame is compressed and coded and output from the recording unit 3 as intraframe-coded data dvi.

The interframe-coded data dve based on the (j−1)th frame and the intraframe-coded data dvi concerning the jth frame are recorded on the magnetic tape 100 as eight helical tracks, for example.

Also in this case, the motion vector data v1, v2 from the motion vector detecting circuit 13 are synthesized with the coded data dv by the synthesizing circuit in the recording-coder 34 and output from the recording unit 3 at a timing in which the recording magnetic head in the recording unit 3 traces an auxiliary track or the above space on the magnetic tape 100. Therefore, the motion vector data v1, v2 are recorded on the auxiliary track or the above space on the magnetic tape 100.

A manner in which the decoding apparatus is operated in the normal mode will be described with reference to FIG. 4. In the initial state, the switching circuit 70 electrically connects the movable contact 70c to the second fixed contact 70b.

At the stage that the reproducing unit 51 reproduces the coded data dv concerning the first frame F1 and the IDCT circuit 64 outputs intraframe-coded reproduced data (reproduced video data) Dvi concerning the first frame F1, no data is stored in the first and second frame memories 65 and 66 or initial data is stored in the first and second frame memories 65 and 66. Therefore, the output circuit 54 outputs invalid data, for example.

At the stage that the reproducing unit 51 reproduces two-way predictive error data concerning the second frame F2 (interframe-coded data based on the second frame F2) and the IDCT circuit 64 outputs two-way predictive error reproduced data De (Dte) concerning the second frame F2, the switching control circuit 72 outputs the output control signal So based on the vertical sync signal VD detected by the detecting circuit in the recording-decoder 61, whereby the output circuit 54 connects the movable contact 54c to the second fixed contact 54b. Thus, the movable contact 54c and the second fixed contact 54b are electrically connected to each other.

As a result, the output circuit 54 outputs intraframe-coded reproduced data (reproduced video data) Dvi concerning the first frame F1 from the first frame memory 65.

At the stage that the reproducing unit 51 reproduces the coded data dv concerning the third frame F3 and the IDCT circuit 64 outputs intraframe-coded reproduced data (reproduced video data) Dvi concerning the third frame F3, the output circuit 54 connects the movable contact 54c to the first fixed contact 54a based on the vertical sync signal VD detected by the detecting circuit in the recording-decoder 61.

At that time, the intraframe-coded reproduced data Dvi concerning the third frame F3 output from the IDCT circuit 64 and the intraframe-coded reproduced data Dvi concerning the first frame F1 output from the second frame memory 66 are supplied to the first and second motion compensating circuits 67 and 68.

The first motion compensating circuit 67 outputs first motion compensation predictive data Dsr by moving the intraframe-coded reproduced data Dvi concerning the third frame F3 by a moving amount indicated by the first motion vector data v1 detected by the detecting circuit in the recording-decoder 61. The second motion compensating circuit 68 outputs second motion compensation predictive data Dsf by moving the intraframe-coded reproduced data Dvi by a moving amount indicated by the second motion vector data v2.

The motion compensation predictive data Dsr and Dsf are added by the first adder 69. Then, the first adder 69 outputs added data of motion compensation predictive data Dsf of the first frame F1 relative to the second frame F2 and motion compensation predictive data Dsr of the third frame F3 relative to the second frame F2, i.e., two-way motion compensation predictive data Dt. The two-way motion compensation predictive data Dt is supplied through the switching circuit 70 (the movable contact 70c is constantly connected to the second fixed contact 70b because of the normal processing) to the second adder 71.

The second adder 71 adds two-way predictive error reproduced data De (Dte) concerning the second frame F2 from the first frame memory 65 and two-way motion compensation predictive data Dt from the first adder 69 to output interframe-coded reproduced data Dve based on the second frame F2. The reproduced data Dve is supplied through the output circuit 54 to the succeeding stage.

Similarly, at the stage that the reproducing unit 51 reproduces two-way predictive error data dve concerning the jth frame and the IDCT circuit 64 outputs two-way predictive error reproduced data Dte concerning the (j−1)th frame, the switching control circuit 72 outputs the output control signal So based on the vertical sync signal VD detected by the detecting circuit in the recording-decoder 61, whereby the output circuit 54 connects the movable contact 54c to the second fixed contact 54b. As a consequence, intraframe-coded reproduced data (reproduced video data) Dvi concerning (j−2)th frame from the first frame memory 65 is supplied through the output circuit 54 to the succeeding stage.

At the stage that the reproducing unit 51 reproduces coded data dv concerning the jth frame and the IDCT circuit 64 outputs intraframe-coded reproduced data (reproduced video data) Dvi concerning the jth frame, the output circuit 54 connects the movable contact 54c to the first fixed contact 54a based on the vertical sync signal VD detected by the detecting circuit in the recording-decoder 61.

At that time, the intraframe-coded reproduced data Dvi concerning the jth frame output from the IDCT circuit 64 and the intraframe-coded reproduced data Dvi concerning the (j−2)th frame from the second frame memory 66 are supplied to the first and second motion compensating circuits 67 and 68.

The first motion compensating circuit 67 outputs first motion compensation predictive data Dsr by moving the intraframe-coded reproduced data Dvi concerning the jth frame by a moving amount indicated by the first motion vector data v1. The second motion compensating circuit 68 outputs second motion compensation predictive data Dsf by moving the intraframe-coded reproduced data Dvi concerning the (j−2)th frame by a moving amount indicated by the second motion vector data v2.

The motion compensation predictive data Dsr and Dsf are added by the first adder 69 and the first adder 69 outputs added data of the motion compensation predictive data Dsf of the (j−2)th frame relative to the (j−1)th frame and the motion compensation predictive data Dsr of the jth frame relative to the (j−1)th frame, i.e., two-way motion compensation predictive data Dt.

The two-way motion compensation predictive data Dt is supplied through the switching circuit 70 to the second adder 71. The second adder 71 adds the two-way predictive error reproduced data Dte concerning the (j−1)th frame supplied thereto from the first frame memory 65 and the two-way motion compensation predictive data Dt supplied thereto from the first adder 69 to output interframe-coded reproduced data (reproduced video data) Dve concerning the (j−1)th frame.

When a series of operation is repeated sequentially, reproduced video data Dv of the (j−1)th frame, the jth frame, the (j+1)th frame, . . . , are sequentially output from the output circuit 54.

A manner in which the coding apparatus and the decoding apparatus process information signals used when an assemble mode edit is carried out will be described with reference to FIGS. 5 through 8.

Initially, a manner in which video data (hundred and first frame, hundred and second frame, . . . ) are edited from the next frame of the sixth frame F6 in the assemble edit mode will be described with reference to FIGS. 5 through 8.

A signal processing executed until video data Dv of sixth frame F6 is input after video data Dv of the first frame F1 has been input is the same as the normal signal processing executed by the above coding apparatus. During a time period in which the video data Dv of the first frame F1 is input and the video data Dv of the sixth frame F6 is input, the recording unit 3 sequentially outputs intraframe-coded data dvi concerning the first frame F1, predictive error data dve concerning the second frame F2, intraframe-coded data dvi concerning the third frame F3, predictive error data dve concerning the fourth frame F4 and intraframe-coded data dvi concerning the fifth frame F5. These data are recorded on the magnetic tape 100.

At the stage that the video data Dv of the hundred and first frame F101 is input as different video data Dv, since the edit information Sh indicative of edit-in and/or edit-out in the assemble mode edit is supplied to the input terminal $\phi$e, the first detecting signal S1 from the detecting circuit 21 is supplied to the switching control circuit 20 and the switching control circuit 20 outputs the first and second control signals P1 and P2. As a result, the first switching circuit 17 connects the movable contact 17c to the first fixed contact 17a. The first switching circuit 17 is held in this state during 2-frame period. Although the second switching circuit 19 intends to connect the movable contact 19c to the second fixed contact 19b, the previous switched state is maintained and the second switching circuit 19 does not switch the movable contact 19c.

Therefore, the video data Dv of the sixth frame F6 output from the first frame memory 11 is input through the second switching circuit 19 to the data compression processing circuit 2. The recording unit 3 outputs intraframe-coded data dvi concerning the sixth frame F6 and the data dvi is recorded on the magnetic tape 100. At that very time, the edit information Sh indicating the edit-in and/or edit-out of the assemble mode edit is delayed by a delay time of one frame by the delay circuit 22.

At the stage that video data of hundred and second frame F102 is input, the switching control circuit 20 outputs the second control signal P2 based on the vertical sync signal VD input thereto from the synchronizing separating circuit, whereby the second switching circuit 19 connects the movable contact 19c to the first fixed contact 19a. At that time, the input video data Dv of the hundred and second frame F102 and the video data Dv of the hundred and first frame F101 supplied from the first frame memory 11 are supplied to the motion vector detecting circuit 13. The motion vector detecting circuit 13 detects one-way motion vector data v1 based on the video data Dv of the hundred and first frame F101.

The first motion compensating circuit 14 outputs one-way motion compensation predictive data Dsr by moving the video data Dv of the hundred and second frame F102 by a moving amount indicated by the first motion vector data v1 supplied thereto from the motion vector detecting circuit 13. The one-way motion compensation predictive data Dsr is input through the first switching circuit 17 to the subtracter 18.

The subtracter 18 subtracts the video data Dv of the hundred and first frame F101 supplied from the first frame memory 11 and the one-way motion compensation predictive data Dsr supplied from the first motion compensating circuit 14 to output one-way predictive error data Dse concerning the hundred and first frame F101. The one-way predictive error data Dse from the subtracter 18 is supplied to and compressed and coded by the data compression processing circuit 2, whereafter it is output from the recording unit 3 as interframe-coded data dve based on the hundred and first frame F101 and recorded on the magnetic tape 100.

At that time, the first motion vector data v1 detected by the motion vector detecting circuit 13 and the edit information (edit information indicative of edit-in and/or edit-out of assemble mode edit) Sh delayed by the delay circuit 22 after video data of hundred and first frame F101 has been input are synthesized with the coded data dv by the synthesizing circuit in the recording-coder 34. Then, the motion vector data v1 and the edit information Sh are recorded on the auxiliary track or the above space on the magnetic tape 100.

At the stage that video data of hundred and third frame F103 is input, because the 2-frame period is elapsed from the frame in which the cue of the assemble mode edit is detected (when video data of the hundred and first frame F101 is input), the switching control circuit 20 supplies the first control signal P1 to the first switching circuit 17, whereby the first switching circuit 17 connects the movable contact 17c to the second fixed contact 17b. The switching control circuit 20 outputs the second control signal P2 based on the vertical sync signal VD supplied thereto from the synchronizing separating circuit, whereby the second switching circuit 19 connects the movable contact 19c to the second fixed contact 19b.

As a consequence, the video data Dv of the hundred and second frame F102 output from the first frame memory 11 is input through the second switching circuit 19 to the data compression processing circuit 2. The recording unit 3 outputs intraframe-coded data dvi concerning the hundred and second frame F102 and the data dvi is recorded on the magnetic tape 100.

At that time, the edit information (edit information indicative of the cue in the assemble mode edit) Sh delayed by the delay circuit 22 after video data of the hundred and second frame F102 has been input is synthesized with the coded data dv by the synthesizing circuit in the recording-coder 34. The edit information Sh is recorded on the auxiliary track or the above space on the magnetic tape 100.

Therefore, the edit information indicating the cue in the assemble mode edit is recorded on the magnetic tape 100 together with one-way predictive error data dve concerning the hundred and first frame F101 and the intraframe-coded data dvi concerning the hundred and second frame F102.

At the stage that video data Dv of hundred and fourth frame F104 is input, the switching control circuit 20 outputs the second control signal P2 based on the vertical sync signal VD input thereto from the synchronizing separating circuit, whereby the second switching circuit 19 connects the movable contact 19c to the first fixed contact 19a.

The input video data Dv of the hundred and fourth frame F104, the video data Dv of the hundred and third frame F103 from the first frame memory 11 and the video data Dv of the hundred and second frame from the second frame memory 12 are supplied to the motion vector detecting circuit 13. Then, the motion vector detecting circuit 13 detects the motion vector data v1, v2 based on the video data Dv of the hundred and third frame F103.

The first motion compensating circuit 14 outputs motion compensation predictive data Dsr of the hundred and fourth frame F104 relative to the hundred and third frame F103. The second motion compensating circuit 15 outputs motion compensation predictive data Dsf of the hundred and first frame F101 relative to the hundred and third frame F103. These motion compensation predictive data Dsr and Dsf are added by the adder 16 and the adder 16 outputs two-way motion compensation predictive data Dt.

The two-way motion compensation predictive data Dt is supplied through the first switching circuit 17 to the subtracter 18. The subtracter 18 subtracts the video data of the hundred and third frame F103 supplied thereto from the first frame memory 11 and the two-way motion compensation predictive data Dt supplied thereto from the adder 16 to output two-way predictive error data Dte concerning the hundred and third frame F103.

The two-way predictive error data Dte from the subtracter 18 is compressed and coded by the data compression processing circuit 2 and output from the recording unit 3 as interframe-coded data dve based on the hundred and third frame F103, thereby being recorded on the magnetic tape 100.

Also in this case, the motion vector data v1 and v2 detected by the motion vector detecting circuit 13 are synthesized with the coded data dv by the synthesizing circuit in the recording-coder 34. The motion vector data v1 and v2 are recorded on the auxiliary track or the above space on the magnetic tape 100.

An operation similar to a series of operation executed when the video data Dv of the hundred and third frame F103 is input and the video data of the hundred and fourth frame F104 is input will hereinafter be repeated sequentially.

Figure 6:
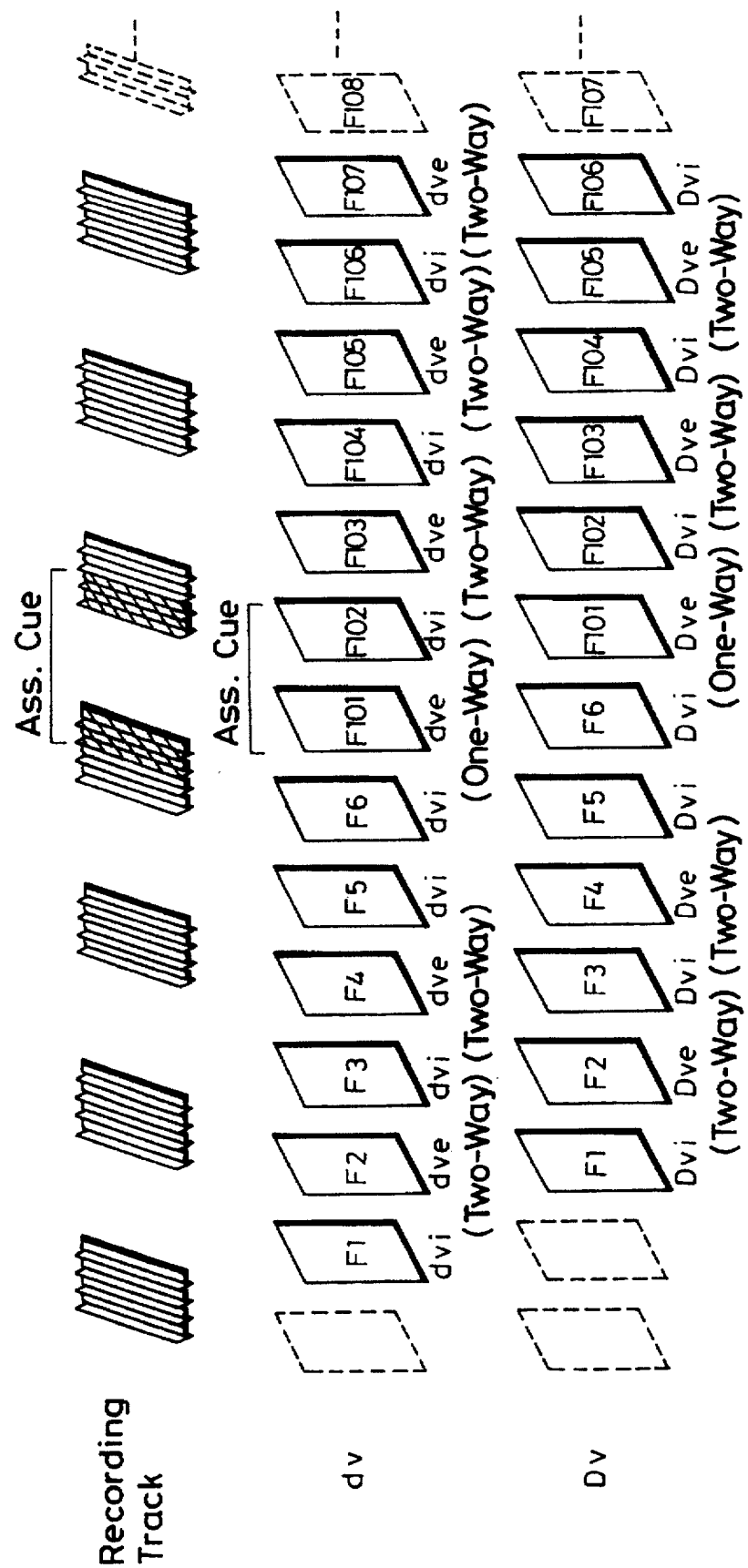
FIG. 6 is an explanatory diagram showing a processing operation executed by the apparatus for decoding information data according to the present invention in assemble mode edit ( . . . F5, F6, F101, F102, . . . )

In the decoding apparatus, as shown in FIG. 6, a signal processing executed until intraframe-coded data dvi of a frame preceding the frame in which the edit information Sh indicative of the cue in the assemble mode edit is recorded is reproduced after intraframe-coded data dvi concerning the first frame F1 has been reproduced is the same as the normal decoding processing. Therefore, during a time period in which the intraframe-coded data dvi concerning the sixth frame F6 is reproduced after the intraframe-coded data dvi concerning the first frame F1 has been reproduced, the output circuit 54 outputs invalid data, the intraframe-coded reproduced data (reproduced video data) Dvi concerning the first frame F1, the interframe-coded reproduced data (reproduced video data) Dve based on the second frame F2, the intraframe-coded reproduced data (reproduced video data) Dvi concerning the third frame F3, the interframe-coded reproduced data (reproduced video data) Dve based on the fourth frame F4 and the intraframe-coded reproduced data (reproduced video data) Dvi concerning the fifth frame F5, in that order.

At the stage that one-way predictive error data dve concerning the hundred and first frame F101 is reproduced, since the edit information Sh indicative of the cue in the assemble mode edit is detected by the detecting circuit in the recording-decoder 61, the switching control circuit 72 outputs the switching control signal Ss and the output control signal So, whereby the switching circuit 70 connects the movable contact 70c to the first fixed contact 70a. The switching circuit 70 is held in this state during 2-frame period. Although the output circuit 54 intends to connect the movable contact 54c to the second fixed contact 54b, the previous switched state is maintained with the result that the output circuit 54 does not switch the movable contact 54c.

Therefore, the output circuit 54 outputs the intraframe-coded reproduced data (reproduced video data) Dvi concerning the sixth frame F6 supplied from the first frame memory 65.

At the stage that the intraframe-coded data dvi concerning the hundred and second frame F102 is reproduced, the switching control circuit 72 outputs the output control signal So based on the vertical sync signal VD detected by the detecting circuit in the recording-decoder 61, whereby the output circuit 54 connects the movable contact 54c to the first fixed contact 54a. The intraframe-coded reproduced data Dvi concerning the hundred and second frame F102 output from the IDCT circuit 64 is supplied to the first motion compensating circuit 67.

The first motion compensating circuit 67 outputs one-way motion compensation predictive data Dsr by moving the intraframe-coded reproduced data Dvi concerning the hundred and second frame F102 by a moving amount indicated by the first motion vector data v1 detected by the detecting circuit in the recording-decoder 61. The one-way motion compensation predictive data Dsr is input through the switching circuit 70 to the succeeding second adder 71.

The second adder 71 adds the one-way predictive error reproduced data Dse concerning the hundred and first frame F101 supplied thereto from the first frame memory 65 and the one-way motion compensation prediction data Dsr supplied thereto from the switching circuit 70 to output interframe-coded reproduced data (reproduced video data) Dve based on the hundred and first frame F101. The reproduced video data Dve is supplied through the output circuit 54 to the succeeding stage.

At the stage that the two-way predictive error data dve concerning the hundred and third frame F103 is reproduced, since the two-frame period is elapsed after the frame in which the cue in the assemble mode edit is detected has been reproduced (video data of hundred and first frame F101 has been reproduced), the switching control circuit 72 outputs the switching control signal Ss to the switching circuit 70, whereby the switching circuit 70 connects the movable contact 70c to the second fixed contact 70b. The switching control circuit 72 outputs the output control signal So based on the vertical sync signal VD detected by the detecting circuit in the recording-decoder 61, whereby the output circuit 54 connects the movable contact 54c to the second fixed contact 54b.

As a consequence, the output circuit 54 outputs intraframe-coded reproduced data (reproduced video data) Dvi concerning the hundred and second frame F102 supplied thereto from the first frame memory 65.

At the stage that the intraframe-coded data dvi concerning the hundred and fourth frame F104 is reproduced, the switching control circuit 72 outputs the output control signal Ss based on the vertical sync signal VD detected by the detecting circuit in the recording-decoder 61, whereby the output circuit 54 connects the movable contact 54c to the first fixed contact 54a.

The intraframe-coded reproduced data Dvi concerning the hundred and fourth frame F104 output from the IDCT circuit 64 and the intraframe-coded reproduced data Dvi concerning the hundred and second frame F102 from the second frame memory 66 are supplied to the first and second motion compensating circuits 67 and 68.

The first motion compensating circuit 67 outputs first motion predictive data Dsr by moving the intraframe-coded reproduced data Dvi concerning the hundred and fourth frame F104 by a moving amount indicated by the first motion vector data vi. The second motion compensating circuit 68 outputs second motion compensation predictive data Dsf by moving the intraframe-coded reproduced data concerning the hundred and second frame F102 by a moving amount indicated by the second motion vector data v2.

The motion compensation predictive data Dsr and Dsf are added by the adder 69 and the adder 69 outputs added data of the motion compensation predictive data Dsf of the hundred and second frame F102 relative to the hundred and third frame F103 and the motion compensation predictive data Dsr of the hundred and fourth frame F104 relative to the hundred and third frame F103, i.e., two-way motion compensation predictive data Dt.

The two-way motion compensation predictive data Dt is supplied through the switching circuit 70 to the second adder 71. Then, the second adder 71 adds the two-way predictive error reproduced data Dte concerning the hundred and third frame F103 from the first frame memory 65 and the two-way motion compensation predictive data Dt from the first adder 69 to output interframe-coded reproduced data (reproduced video data) Dve concerning the hundred and third frame F103.

When a series of operation is repeated sequentially, the output circuit 54 sequentially outputs reproduced video data Dv of hundred and fifth frame, hundred and sixth frame, hundred and seventh frame, . . . .

A manner in which other video data (hundred and first frame, hundred and second frame, . . . ) are edited from the frame next to the fifth frame F5 in the assemble edit mode will be described with reference to FIGS. 7 and 8.

Figure 7:
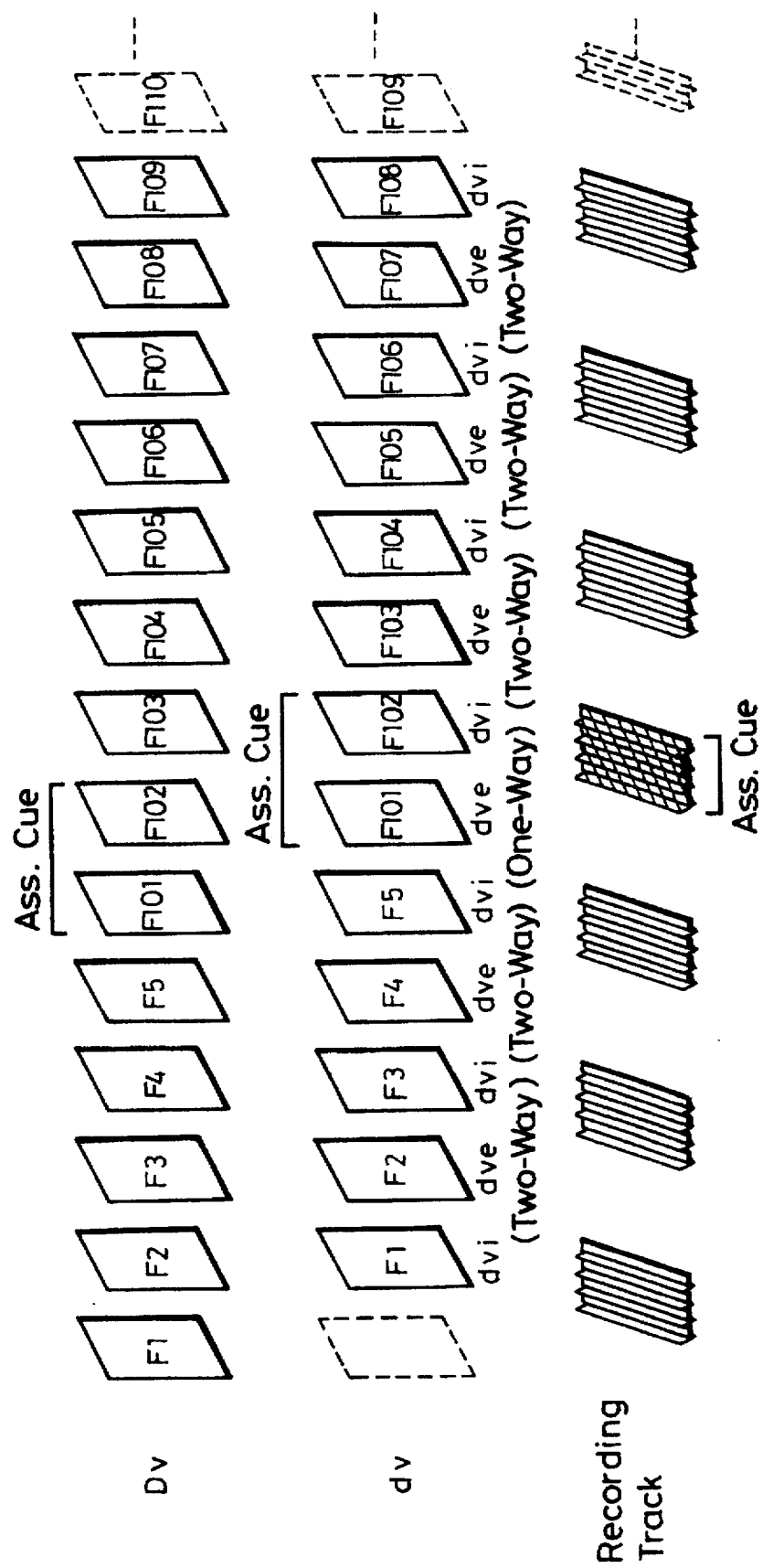
FIG. 7 is an explanatory diagram showing a processing operation executed by the apparatus for coding information data according to the present invention in assemble mode edit ( . . . F4, F5, F101, F102, . . . )

As shown in FIG. 7, a signal processing executed until video data Dv of the fifth frame F5 is input after video data Dv of the first frame F1 has been input is the same as the normal signal processing (see FIG. 3) of the encoding apparatus. Therefore, during the period in which video data of the first frame F1 is input and video data of the fifth frame F5 is input, the recording unit 3 sequentially outputs the intraframe-coded data dvi concerning the first frame F1, the two-way predictive error data dve concerning the second frame F2, the intraframe-coded data dvi concerning the third frame F3 and the two-way predictive error data dve concerning the fourth frame F4. These data are recorded on the magnetic tape 100.

At the stage that video data Dv of the hundred and first frame F101, which is other video data Dv, is input, since the edit information Sh indicative of the cue in the assemble mode edit is supplied to the input terminal φe, the first detecting signal S1 is supplied from the detecting circuit 21 to the switching control circuit 20 and the switching control circuit 20 outputs the first and second control signals P1 and P2, whereby the first switching circuit 17 connects the movable contact 17c to the first fixed contact 17a. The first switching circuit 17 is set in this state during 2-frame period. The second switching circuit 19 connects the movable contact 19c to the second fixed contact 19b.

Therefore, the video data Dv output from the first frame memory 65 is input through the second switching circuit 19 to the data compression processing circuit 2. The intraframe-coded data dvi concerning the fifth frame F5 is output from the recording unit 3 and the data dvi is recorded on the magnetic tape 100. At that time, the edit information Sh indicative of the cue in the assemble mode edit is delayed by a delay time of one frame by the delay circuit 22.

At the stage that video data Dv of the hundred and second frame F102 is input, the switching control circuit 20 outputs the second control signal P2 based on the vertical sync signal VD input thereto from the synchronizing separating circuit, whereby the second switching circuit 19 connects the movable contact 19c to the first fixed contact 19a.

As a consequence, one-way predictive error data Dse concerning the hundred and first frame F101 is input through the first and second switching circuits 17 and 19 to the data compression processing circuit 2. The one-way predictive error data Dse is compressed and coded by the data compression processing circuit 2 and output from the recording unit 3 as interframe-coded data dve based on the hundred and first frame F101, thereby being recorded on the magnetic tape 100.

The first motion vector data v1 detected by the motion vector detecting circuit 13 and the edit information (edit information indicative of the cue in the assemble mode edit) Sh delayed by the delay circuit 22 after video data of the hundred and first frame F101 has been input are synthesized with the coded data dv by the synthesizing circuit in the recording-coder 34. The motion vector data v1 and the edit information Sh are recorded on the auxiliary track or the above space on the magnetic tape 100.

At the stage that video data Dv of the hundred and third frame F103 is input, since 2-frame period is elapsed from the frame in which the cue in the assemble mode edit is detected (when video data of the hundred and first frame F101 is input), the switching control circuit 20 supplies the first control signal P1 to the first switching circuit 17, whereby the first switching circuit 17 connects the movable contact 17c to the second fixed contact 17b. The switching control circuit 20 outputs the second control signal P2 based on the vertical sync signal VD input thereto from the synchronizing separating circuit, whereby the second switching circuit 19 connects the movable contact 19c to the second fixed contact 19b.

As a result, video data of the hundred and second frame F102 output from the first frame memory 11 is input through the second switching circuit 19 to the data compression processing circuit 2. Intraframe-coded data dvi concerning the hundred and second frame F102 is output from the recording unit 3 and the data dvi is recorded on the magnetic tape 100.

Edit information (edit information indicative of the cue in the assemble mode edit) delayed by the delay circuit 22 after video data of hundred and second frame F102 has been input is synthesized with the coded data dv by the synthesizing circuit in the recording-coder 34. The edit information Sh is recorded on the auxiliary track or the above space on the magnetic tape 100.

Therefore, the edit information Sh indicating the cue in the assemble mode edit is recorded on the magnetic tape 100 together with the one-way predictive error data dve concerning the hundred and first frame F101 and the intraframe-coded data dvi concerning the hundred and second frame F102.

At the stage that the video data Dv of the hundred and fourth frame F104 is input, the switching control circuit 20 outputs the second control signal P2 based on the vertical sync signal VD input thereto from the synchronizing separating circuit, whereby the second switching circuit 19 connects the movable contact 19c to the first fixed contact 19a.

Therefore, two-way predictive error data Dte concerning hundred and third frame F103 is input through the first and second switching circuits 17 and 19 to the data compression processing circuit 2. The two-way predictive error data Dte is compressed and coded by the data compression processing circuit 2 and output from the recording unit 3 as interframe-coded data dve based on the hundred and third frame F103 and recorded on the magnetic tape 100.

Also in this case, the first and second motion vector data v1 and v2 detected by the motion vector detecting circuit 13 are synthesized with the coded data dv by the synthesizing circuit in the recording-coder 34. The motion vector data v1 and v2 are recorded on the auxiliary track or the above space on the magnetic tape 100.

An operation similar to a series of operation executed when the video data Dv of the hundred and third frame F103 is input and the video data of the hundred and fourth frame F104 is input will hereinafter be repeated sequentially.

Figure 8:
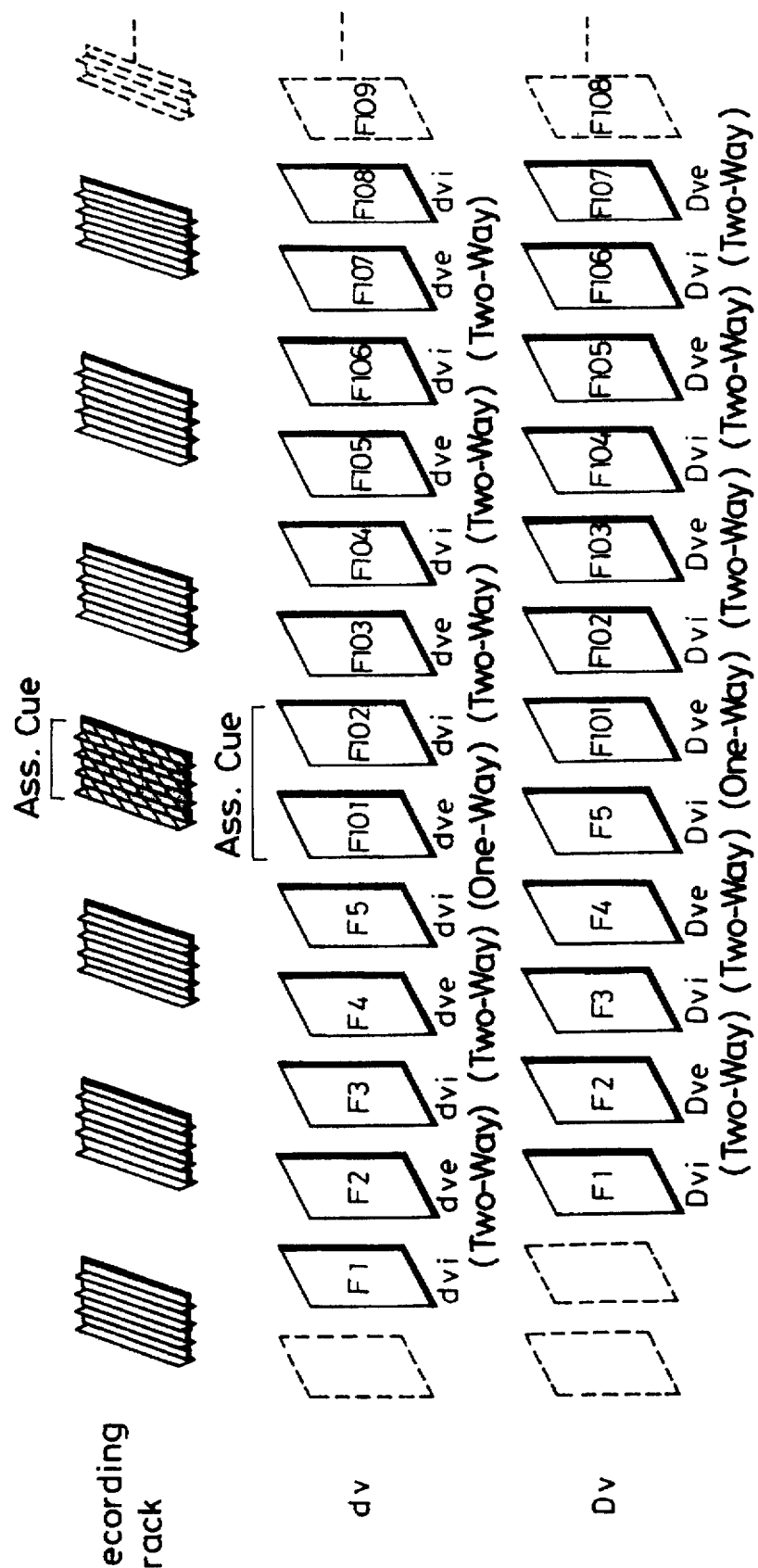
FIG. 8 is an explanatory diagram showing a processing operation executed by the apparatus for decoding information data according to the present invention in assemble mode edit ( . . . F4, F5, F101, F102, . . . )

In the decoding apparatus, as shown in FIG. 8, a signal processing executed until intraframe-coded data dvi concerning the frame (in this case, fifth frame F5) preceding the frame in which the edit information Sh indicating the cue in the assemble mode edit is recorded is reproduced after intraframe-coded data dvi concerning the first frame F1 has been reproduced is the same as the signal processing in the normal decode processing. During the period in which intraframe-coded data dvi concerning the first frame F1 is reproduced and intraframe-coded data dvi concerning the fifth frame F5 is reproduced, the output circuit 54 outputs invalid data, intraframe-coded reproduced data (reproduced video data) Dvi concerning the first frame F1, interframe-coded reproduced data (reproduced video data) Dve concerning the second frame F2, intraframe-coded reproduced data (reproduced video data) Dvi concerning the third frame F3 and interframe-coded reproduced data (reproduced video data) Dve based on the fourth frame F4, in that order.

At the stage that the one-way predictive error data dve concerning the hundred and first frame is reproduced, since the edit information Sh indicative of the cue in the assemble mode edit is detected by the detecting circuit in the recording-decoder 61, the switching control circuit 20 outputs the switching control signal Ss and the output control signal So, whereby the switching circuit 70 connects the movable contact 70c to the first fixed contact 70a. The switching circuit 70 is set in this state during 2-frame period. The output circuit 54 connects the movable contact 54c to the second fixed contact 54b during one-frame period.

As a result, the output circuit 54 outputs the intraframe-coded reproduced data (reproduced video data) Dvi concerning the fifth frame F5 supplied thereto from the first frame memory 65.

At the stage that the intraframe-coded data dvi concerning the hundred and second frame F102 is reproduced, the switching control circuit 72 outputs the output control signal So based on the vertical sync signal VD detected by the detecting circuit in the recording-decoder 61, whereby the output circuit 54 connects the movable contact 54c to the first fixed contact 54a.

Therefore, the output circuit 54 outputs interframe-coded reproduced data (reproduced video data) Dve based on the one-way predictive error reproduced data Dse concerning the hundred and first frame F101 through the switching circuit 70.

At the stage that the two-way predictive error data dve concerning the hundred and third frame F103 is reproduced, since two-frame period is elapsed from the frame in which the cue in the assemble mode edit is detected (when video data of the hundred and first frame F101 was reproduced), the switching control circuit 72 outputs the switching control signal Ss to the switching circuit 70, whereby the switching circuit 70 connects the movable contact 70c to the second fixed contact 70b. At that time, the switching control circuit 72 outputs the output control signal So based on the vertical sync signal VD detected by the detecting circuit in the recording-decoder 61, whereby the output circuit 54 connects the movable contact 54c to the second fixed contact 54b.

As a result, the output circuit 54 outputs the intraframe-coded reproduced data (reproduced video data) Dvi concerning the hundred and second frame F102 supplied thereto from the first frame memory 65.

At the stage that the intraframe-coded data dvi concerning the hundred and fourth frame is reproduced, the switching control circuit 72 outputs the output control signal So based on the vertical sync signal VD detected by the detecting circuit in the recording-decoder 61, whereby the output circuit 54 connects the movable contact 54c to the first fixed contact 54a.

As a result, the output circuit 54 outputs interframe-coded reproduced data (reproduced video data) Dve based on the two-way predictive error reproduced data Dte concerning the hundred and third frame F103.

When a series of operation is sequentially repeated, the output circuit 54 outputs reproduced video data Dv of hundred and fifth frame F105, hundred and sixth frame F106, hundred and seventh frame F107, . . . . , in that order.

A manner in which the encoding apparatus and the decoding apparatus process information signals in order to perform the insert mode edit will be described with reference to FIGS. 9 through 16.

Initially, a manner in which video data (video data of hundred and first frame to hundred and fourth frame) of other four frames from the frame next to the fourth frame F4 are edited in the insert mode edit will be described with reference to FIGS. 9 and 10.

Figure 9:
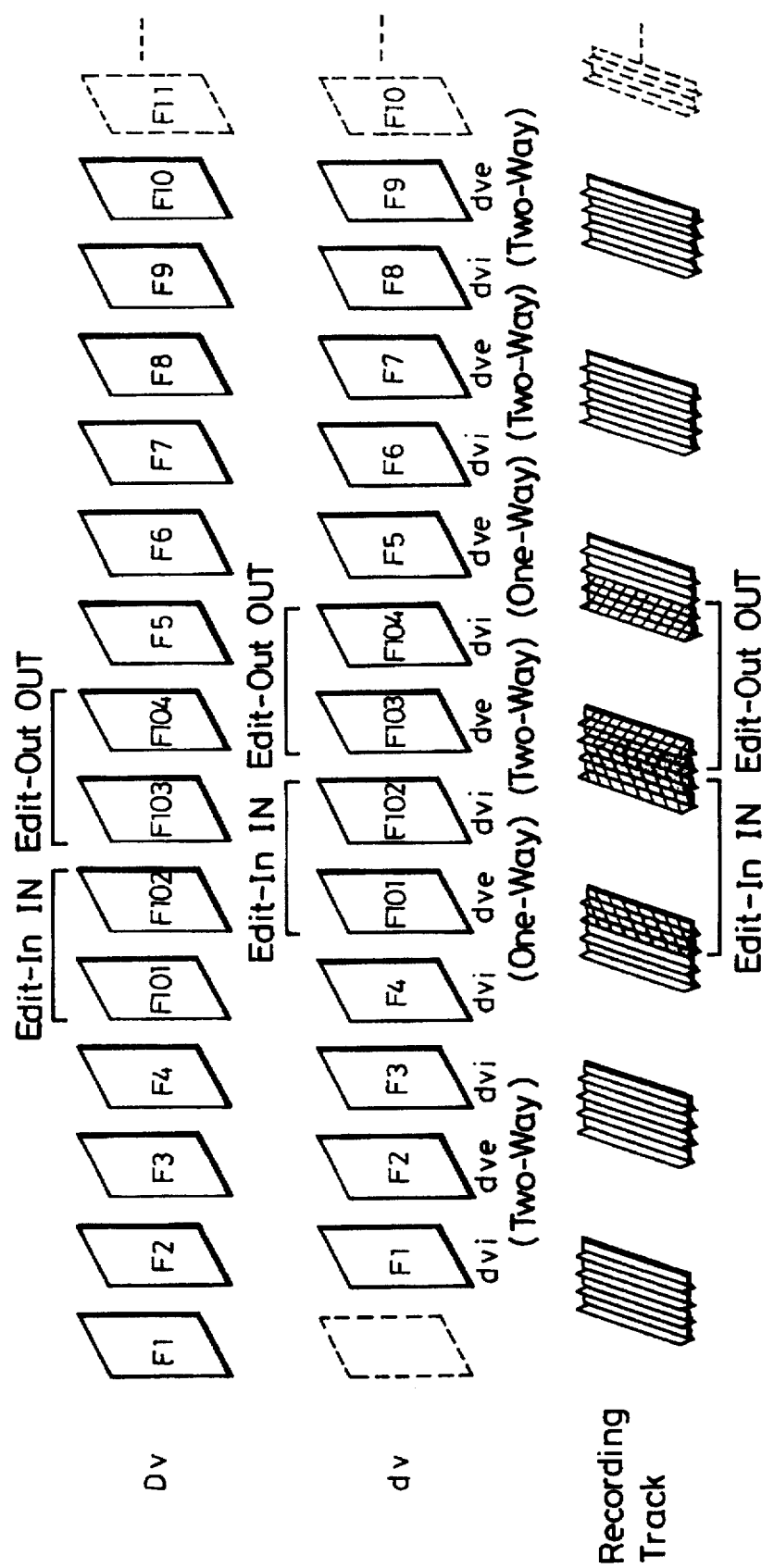
FIG. 9 is an explanatory diagram showing a processing operation executed by the apparatus for coding information data according to the present invention in insert mode edit ( . . . F3, F4, (F101–F105), F5, F6, . . . )

As shown in FIG. 9, a signal processing until video data Dv of the fourth frame F4 is input after video data Dv of the first frame F1 has been input is the same as that in the normal signal processing (see FIG. 3) executed by the encoding apparatus. During a period in which video data Dv of the first frame F1 is input and video data Dv of the fourth frame F4 is input, the recording unit 3 outputs invalid data, intraframe-coded data dvi concerning the first frame F1, two-way predictive error data dve concerning the second frame F2 and intraframe-coded data dvi concerning the third frame F3, in that order. These data are recorded on the magnetic tape 100.

At the stage that video data Dv of hundred and first frame F101, which is other video data, is input, since the edit information Sh indicative of edit-in IN is supplied to the input terminal φe, the detecting circuit 2 supplies the first detecting signal S1 to the switching control circuit 20 and the switching control circuit 20 outputs the first and second control signals P1 and P2. Thus, the first switching circuit 17 connects the movable contact 17c to the first fixed contact 17a. The first switching circuit 17 is held in this state during 2-frame period. The second switching circuit 19 connects the movable contact 19c to the second fixed contact 19b.

Therefore, the video data Dv of the fourth frame F4 output from the first frame memory 65 is input through the second switching circuit 19 to the data compression processing circuit 2. The recording unit 3 outputs the intraframe-coded data dvi concerning the fourth frame F4. The data dvi is recorded on the magnetic tape 100. At that time, the edit information indicative of the edit-in IN is delayed by a delay time of one frame period by the delay circuit 22.

At the stage that video data Dv of hundred and second frame F102 is input, the switching control circuit 20 outputs the second control signal P2 based on the vertical sync signal VD input thereto from the synchronizing separating circuit, whereby the second switching circuit 19 connects the movable contact 19c to the first fixe contact 19a.

Accordingly, one-way predictive error data Dse concerning the hundred and first frame F101 is input through the first and second switching circuits 17 and 19 to the data compression processing circuit 2. The one-way predictive error data Dse is compressed and coded by the data compression processing circuit 2 and then output from the recording unit 3 as interframe-coded data dve based on the hundred and first frame, thereby being recorded on the magnetic tape 100.

The first motion vector data v1 detected by the motion vector detecting circuit 13 and the edit information (edit information indicative of the edit-in IN) Sh delayed by the delay circuit 22 after video data of the hundred and first frame F101 has been input are synthesized with the coded data dv by the synthesizing circuit in the recording-coder 34. The motion vector data v1 and the edit information Sh are recorded on the auxiliary track or the above space on the magnetic tape 100.

At the stage that the video data Dv of the hundred and third frame F103 is input, since the two-frame period is elapsed from the frame in which the edit-in IN is detected (when video data of hundred and first frame is input), the switching control circuit 20 supplies the first control signal P1 to the first switching circuit 17, whereby the first switching circuit 17 connects the movable contact 17c to the second fixed contact 17b. At that time, the switching control circuit 20 outputs the second control signal P2 based on the vertical sync signal VD input thereto from the synchronizing separating circuit, whereby the second switching circuit 19 connects the movable contact 19c to the second fixed contact 19b.

As a result, video data Dv of the hundred and second frame F102 output from the first frame memory 11 is input through the second switching circuit 19 to the data compression processing circuit 2. Intraframe-coded data dvi concerning the hundred and second frame F102 is output from the recording unit 3 and the data dvi is recorded on the magnetic tape 100.

The edit information (edit information indicating the edit-in IN) delayed by the delay circuit 22 after video data of the hundred and second frame has been input is synthesized with the coded data dv by the synthesizing circuit in the recording-coder 34. The edit information Sh is recorded on the auxiliary track or the above space on the magnetic tape 100.

Therefore, the edit information Sh indicative of the edit-in IN is recorded on the magnetic tape 100 together with the one-way predictive error data dve concerning the hundred and first frame F101 and the intraframe-coded data dvi concerning the hundred and second frame F102.

At the stage that video data Dv of the hundred and fourth frame is input, the switching control circuit 20 outputs the second control signal P2 based on the vertical sync signal VD input thereto from the synchronizing separating circuit, whereby the second switching circuit 19 connects the movable contact 19c to the first fixed contact 19a.

As a result, two-way predictive error data Dte concerning the hundred and third frame F103 is input through the first and second switching circuits 17 and 19 to the data compression processing circuit 2. Then, the two-way predictive error data Dte is compressed and coded by the data compression processing circuit 2 and then output from the recording unit 3 as interframe-coded data dve based on the hundred and third frame F103, thereby being recorded on the magnetic tape 100.

Furthermore, the first and second motion vector data v1 and v2 detected by the motion vector detecting circuit 13 and edit information (edit information indicative of edit-out OUT) Sh delayed by the delay circuit 22 after video data of the hundred and third frame has been input are synthesized with the coded data dv by the synthesizing circuit in the recording-coder 34. The motion vector data v1 and v2 and the edit information Sh indicative of the edit-out OUT are recorded on the auxiliary track or the above space on the magnetic tape 100.

At the stage that the insert mode edit is finished and the video data Dv of the fifth frame F5 is input, since the supply of the edit information Sh indicative of the edit-out OUT to the input terminal φe is ceased, the detecting circuit 21 supplies the first detecting signal S1 to the switching control circuit 20 and the switching control circuit 20 outputs the first and second control signals P1 and P2, whereby the first switching circuit 17 connects the movable contact 17c to the first fixed contact 17a. The first switching circuit 17 is held in this state during two-frame period. The second switching circuit 19 connects the movable contact 19c to the second fixed contact 19b.

The video data Dv of the hundred and fourth frame F104 output from the first frame memory 11 is input through the second switching circuit 19 to the data compression processing circuit 2. The intraframe-coded data dvi concerning the hundred and fourth frame F104 is output from the recording unit 3 and the data dvi is recorded on the magnetic tape 100.

At that time, the edit information (edit information indicating the edit-out OUT) delayed by the delay circuit 22 when video data of the hundred and fourth frame F104 is input is synthesized with the coded data dv by the synthesizing circuit in the recording-coder 34. The edit information Sh is recorded on the auxiliary track or the above space on the magnetic tape 100.

As a result, the edit information Sh indicative of the edit-out OUT is recorded on the magnetic tape 100 together with the two-way predictive error data dve concerning the hundred and third frame F103 and the intraframe-coded data dvi concerning the hundred and fourth frame 104.

At the stage that the video data Dv of the sixth frame F6 is input, the switching control circuit 20 supplies the second control signal P2 based on the vertical sync signal VD input thereto from the synchronizing separating circuit, whereby the second switching circuit 19 connects the movable contact 19c to the first fixed contact 19a.

Therefore, one-way predictive error data Dse concerning the fifth frame F5 is input through the first and second switching circuits 17 and 19 to the data compression processing circuit 2. The one-way predictive error data Dse is compressed and coded by the compressing circuit 2 and then output from the recording unit 3 as interframe-coded data dve based on the fifth frame F5, thereby being recorded on the magnetic tape 100.

Also in this case, the first motion vector data v1 detected by the motion vector detecting circuit 13 and synthesized with the coded data dv by the synthesizing circuit in the recording-coder 34. The motion vector data v1 is recorded on the auxiliary track or the above space on the magnetic tape 100.

At the stage that the video data Dv of the seventh frame F7 is input, since the two-frame period is elapsed from the frame in which the edit-out OUT is detected (when video data of the fifth frame F5 is input), the switching control circuit 20 outputs the first control signal P1 to the first switching circuit 17, whereby the first switching circuit 17 connects the movable contact 17c to the second fixed contact 17b. The switching control circuit 20 outputs the second control signal P2 based on the vertical sync signal VD from the synchronizing separating circuit, whereby the second switching circuit 19 connects the movable contact 19c to the second fixed contact 19b.

As a result, the video data of the sixth frame F6 output from the first frame memory 11 is input through the second switching circuit 19 to the data compression processing circuit 2. The intraframe-coded data dvi concerning the sixth frame is output from the recording unit 3 and the data dvi is recorded on the magnetic tape 100.

At the stage that video data Dv of the eighth frame F8 is input, the switching control circuit 20 outputs the second control signal P2 based on the vertical sync signal VD input thereto from the synchronizing separating circuit, whereby the second switching circuit 19 connects the movable contact 19c to the first fixed contact 19a.

As a result, two-way predictive error data Dte concerning the seventh frame F7 is input through the first and second switching circuits 17 and 19 to the data compression processing circuit 2. The two-way predictive error data Dte is compressed and coded by the data compression processing circuit 2 and then output from the recording unit 3 as interframe-coded data dve based on the seventh frame F7, thereby being recorded on the magnetic tape 100.

The first and second motion vector data v1 and v2 detected by the motion vector detecting circuit 13 are synthesized with the coded data dv by the synthesizing circuit in the recording-coder 34. The motion vector data v1 and v2 are recorded on the auxiliary track or the above space on the magnetic tape 100.

An operation similar to a series of operation executed when the video data Dv of the seventh frame F7 is input and the video data of the eighth frame F8 is input will hereinafter be repeated sequentially.

Figure 4:
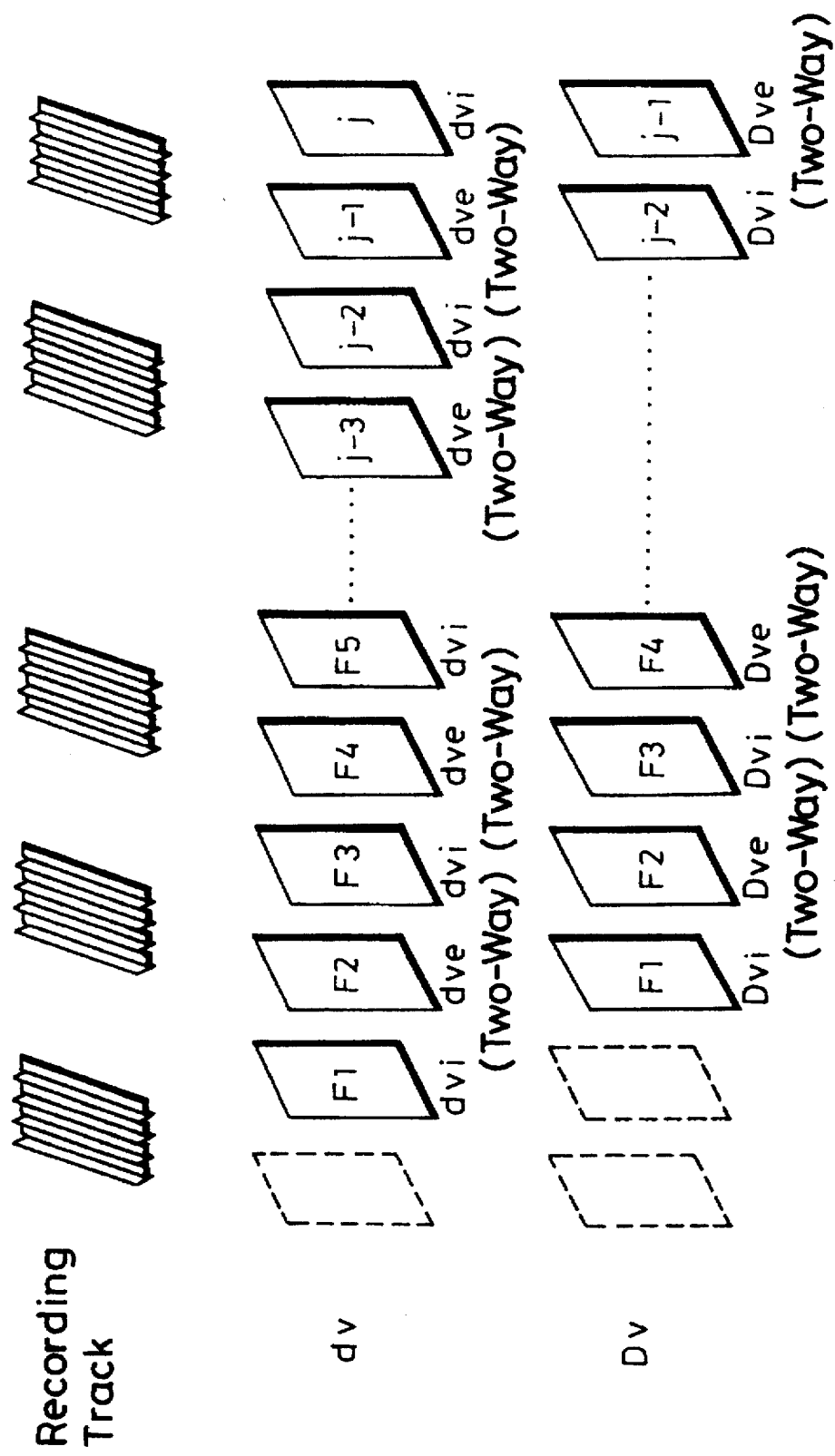
FIG. 4 is an explanatory diagram showing a normal processing executed by the apparatus for decoding information data according to the present invention.
Figure 5:
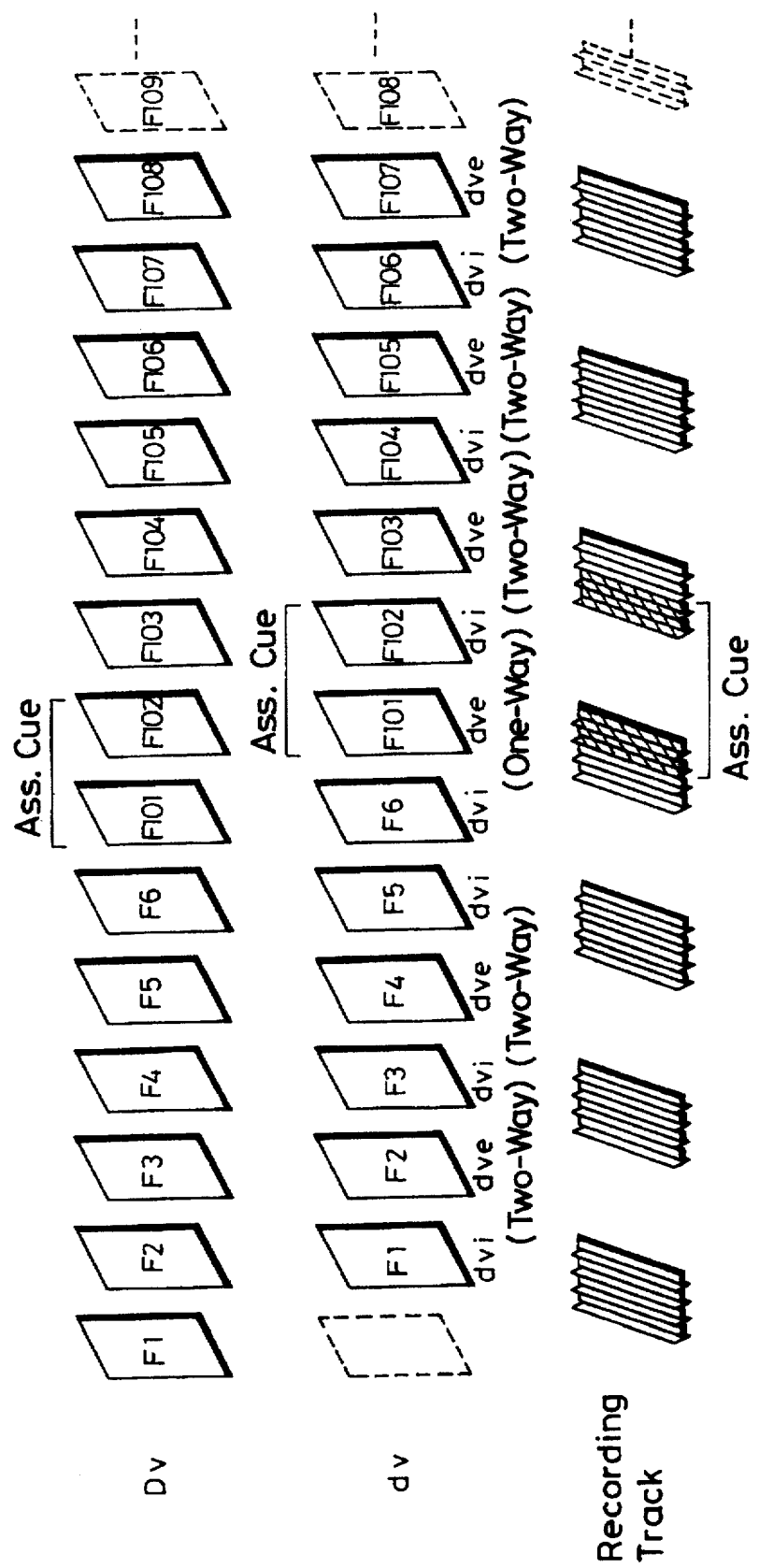
FIG. 5 is an explanatory diagram showing a processing operation executed by the apparatus for coding information data according to the present invention in assemble edit ( . . . F5, F6, F101, F102, . . . )
Figure 10:
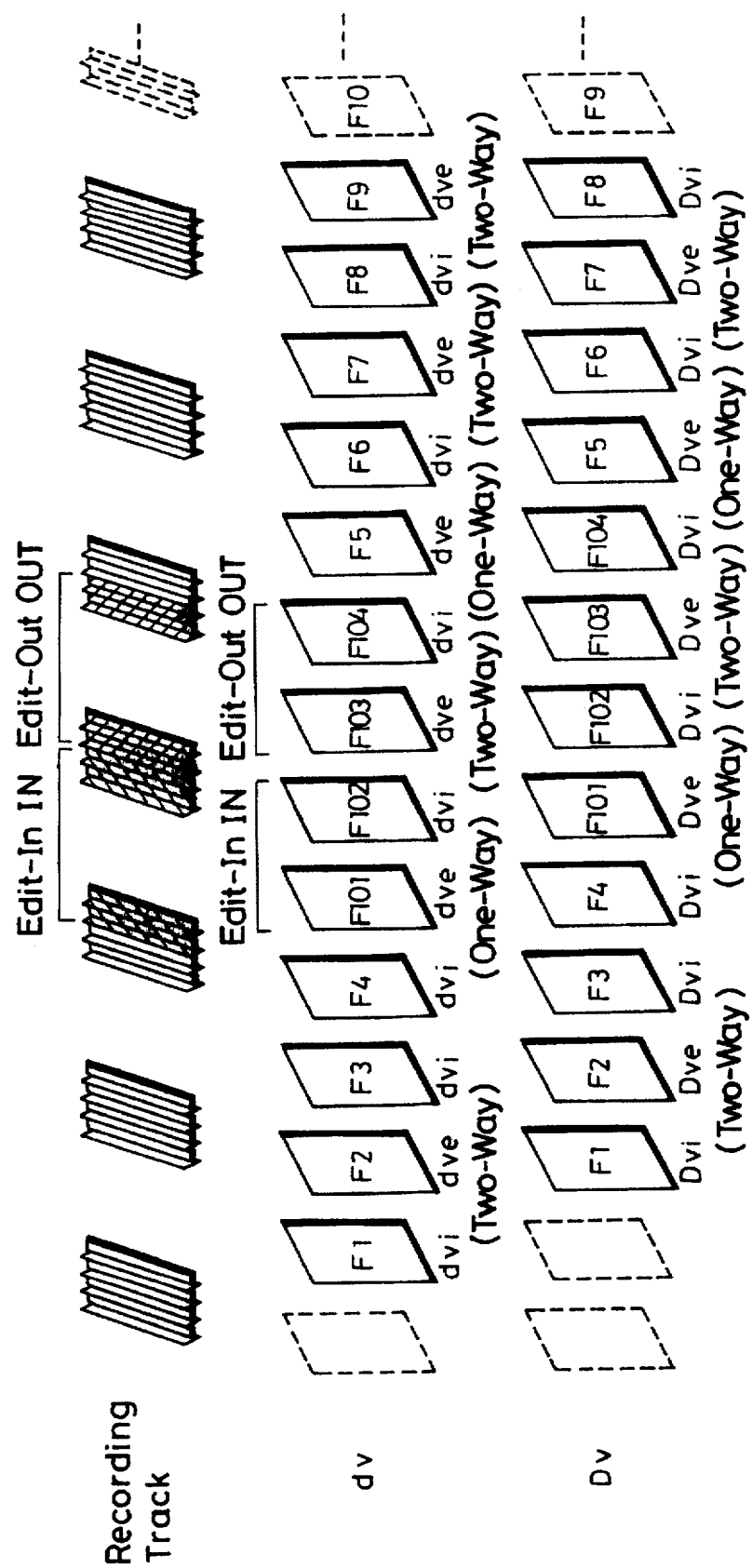
FIG. 10 is an explanatory diagram showing a processing operation executed by the apparatus for decoding information data according to the present invention in insert mode edit ( . . . F3, F4, (F101–F104), F5, F6, . . . )

In the decoding apparatus, as shown in FIG. 10, at the stage that the intraframe-coded data dvi concerning the first frame F1 is reproduced, the signal processing until the intraframe-coded data dvi concerning the frame (in this case, fourth frame F4) preceding the frame in which the edit information Sh indicating the edit-in IN is recorded is reproduced after intraframe-coded data dvi concerning the first frame F1 has been reproduced is the same as that in the normal decode processing (see FIG. 4). During the period in which the intraframe-coded data dvi concerning the first frame F1 is reproduced and the intraframe-coded data dvi concerning the fourth frame F4 is reproduced, the output circuit 54 outputs invalid data, intraframe-coded reproduced data (reproduced video data) Dvi concerning the first frame F1, interframe-coded reproduced data (reproduced video data) dve based on the second frame F2 and intraframe-coded reproduced data (reproduced video data) Dvi concerning the third frame F3, in that order.

At the stage that one-way predictive error data dve concerning the hundred and first frame F101 is reproduced, when the edit information Sh indicating the edit-in IN is detected by the detecting circuit in the recording-decoder 61, the switching control circuit 72 outputs the switching control signal Ss and the output control signal So, whereby the switching circuit 70 connects the movable contact 70c to the first fixed contact 70a. The switching circuit 70 is held in this state during 2-frame period. The output circuit 54 connects the movable contact 54c to the second fixed contact 54b during one-frame period.

As a result, the output circuit 54 outputs intraframe-coded reproduced data (reproduced video data) Dvi concerning the fourth frame F4 supplied thereto from the first frame memory 65.

At the stage that intraframe-coded data dvi concerning the hundred and second frame F102 is reproduced, the switching control circuit 72 outputs the output control signal So based on the vertical sync signal VD detected by the detecting circuit in the recording-decoder 61, whereby the output circuit 54 connects the movable contact 54c to the first fixed contact 54a.

Therefore, the output circuit 54 outputs interframe-coded reproduced data (reproduced video data) Dve based on the one-way predictive error reproduced data Dse concerning the hundred and first frame F101 through the switching circuit 70.

At the stage that two-way predictive error data dve concerning the hundred and third frame F103 is reproduced, when the two-frame period is elapsed from the frame in which the edit-in IN is detected (when video data of the hundred and first frame 101 is reproduced), the switching control circuit 72 outputs the switching control signal Ss, whereby the switching circuit 70 connects the movable contact 70c to the second fixed contact 70b. Furthermore, the switching control circuit 72 outputs the output control signal So based on the vertical sync signal VD detected by the detecting circuit in the recording-decoder 61, whereby the output circuit 54 connects the movable contact 54c to the second fixed contact 54b.

As a consequence, the output circuit 54 outputs intraframe-coded reproduced data (reproduced video data) Dvi concerning the hundred and second frame F102 supplied thereto from the first frame memory 65.

At the stage that the intraframe-coded data dvi concerning the hundred and fourth frame F104 is reproduced, the switching control circuit 72 outputs the output control signal Ss based on the vertical sync signal VD detected by the detecting circuit in the recording-decoder 61, whereby the output circuit 54 connects the movable contact 54c to the first fixed contact 54a.

Therefore, the output circuit 54 outputs interframe-coded reproduced data (reproduced video data) Dve based on the two-way predictive error reproduced data Dte concerning the hundred and third frame F103.

At the stage that data concerning the insert mode edit is finished and the one-way predictive error data dve concerning the fifth frame F5 is reproduced, since the edit information Sh indicating the edit-out OUT is no more detected by the detecting circuit in the recording-decoder 61, the switching control circuit 72 outputs the switching control signal Ss and the output control signal So, whereby the switching circuit 70 connects the movable contact 70c to the first fixed contact 70a. The switching circuit 70 is held in this state during two-frame period. The output circuit 54 connects the movable contact 54c to the second fixed contact 54b during one-frame period.

As a consequence, the output circuit 54 outputs intraframe-coded reproduced data (reproduced video data) Dvi concerning the hundred and fourth frame F104 supplied thereto from the first frame memory 65.

At the stage that the intraframe-coded data dvi concerning the sixth frame F6 is reproduced, the switching control circuit 72 outputs the output control signal So based on the vertical sync signal VD detected by the detecting circuit in the recording decoder 61, whereby the output circuit 54 connects the movable contact 54c to the first fixed contact 54a.

Therefore, the output circuit 54 outputs interframe-coded reproduced data (reproduced video data) Dve based on the one-way predictive error reproduced data Dse concerning the fifth frame F5 through the switching circuit 70.

At the stage that two-way predictive error data dve concerning the seventh frame F7 is reproduced, since the two-frame period is elapsed from the frame in which the termination of edit-out OUT is detected (when video data of fifth frame F5 is reproduced), the switching control circuit 72 outputs the switching control signal Ss, whereby the switching circuit 70 connects the movable contact 70c to the second fixed contact 70b. Furthermore, the switching control circuit 72 outputs the output control signal So based on the vertical sync signal VD detected by the detecting circuit in the recording-decoder 61, whereby the output circuit 54 connects the movable contact 54c to the second fixed contact 54b.

As a consequence, the output circuit 54 outputs intraframe-coded reproduced data (reproduced video data) Dvi concerning the sixth frame F6 supplied thereto from the first frame memory 65.

Then, at the stage that the intraframe-coded data dvi concerning the eighth frame F8 is reproduced, the switching control circuit 72 outputs the output control signal So based on the vertical sync signal VD detected by the detecting circuit in the recording-decoder 61, whereby the output circuit 54 connects the movable contact 54c to the first fixed contact 54a.

Therefore, the output circuit 54 outputs interframe-coded reproduced data (reproduced video data) Dve based on the two-way predictive error reproduced data Dte concerning the seventh frame F7.

An operation similar to a series of operation in which the two-way predictive error data dve concerning the seventh frame F7 is reproduced and the intraframe-coded data dvi concerning the eighth frame F8 is reproduced will hereinafter be repeated sequentially.

Figure 11:
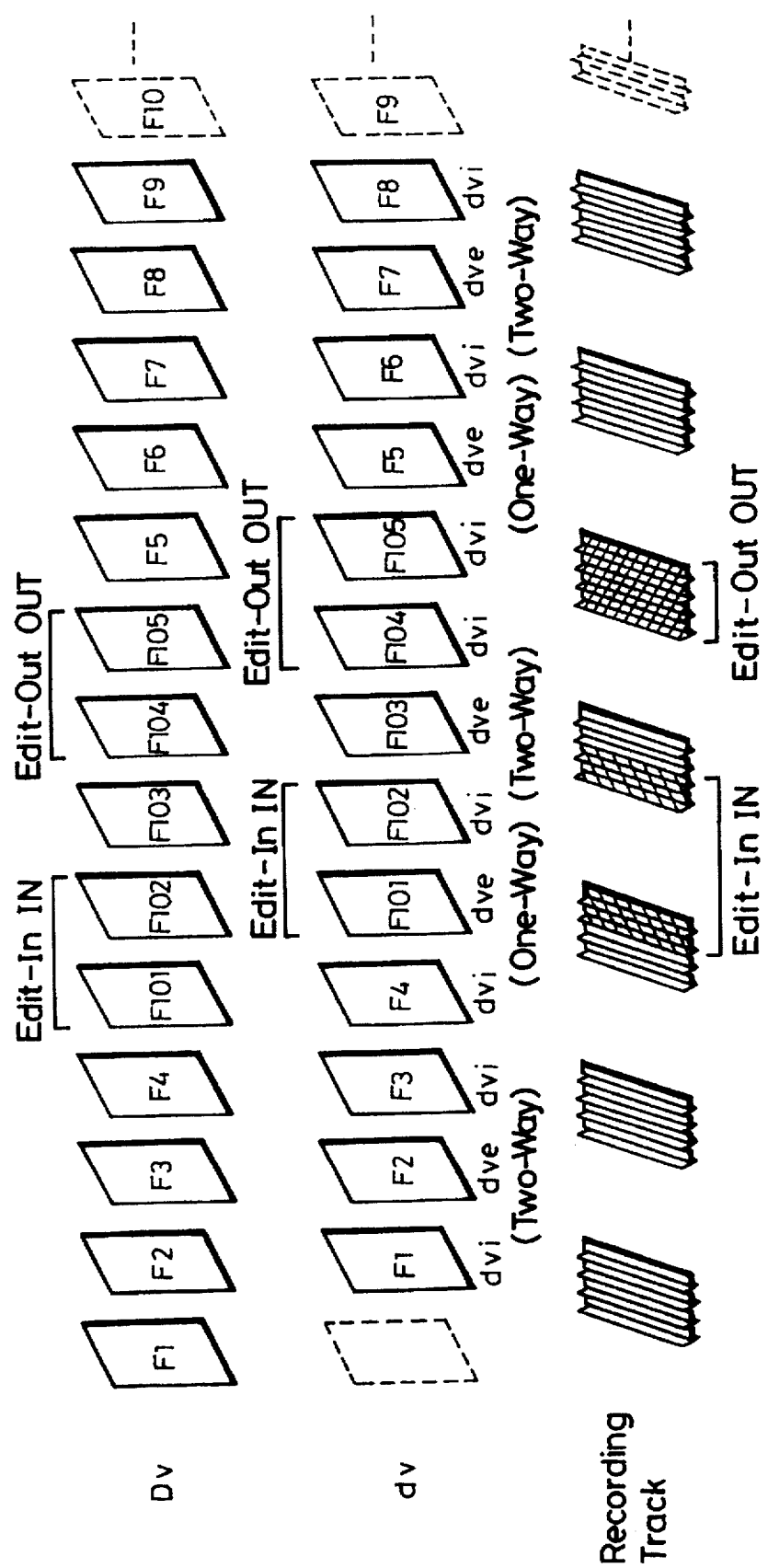
FIG. 11 is an explanatory diagram showing a processing operation executed by the apparatus for coding information data according to the present invention in insert mode edit ( . . . F3, F4, (F101–F105), F5, F6, . . . )

A manner in which video data of other 5 frame from the frame next to the fourth frame F4 (video data of the hundred and first frame F101 to the hundred and fifth frame F105) are edited in the insert mode edit will be described with reference to FIGS. 11 and 12.

A signal processing until the video data Dv of the hundred and fourth frame F104 is input after the video data of the first frame F1 has been input is the same as that in the signal processing (see FIG. 9) executed by the encoding apparatus and therefore need not be described herein.

At the stage that the video data Dv of the hundred and fifth frame F105 is input, the switching control circuit 20 outputs the second control signal P2 based on the vertical sync signal VD input thereto from the synchronizing separating circuit, whereby the second switching circuit 19 connects the movable contact 19c to the second fixed contact 19b.

As a consequence, the video data Dv of the hundred and fourth frame F104 output from the first frame memory 11 is input through the second switching circuit 19 to the data compression processing circuit 2. Intraframe-coded data dvi concerning the hundred and fourth frame F104 is output from the recording unit 3 and recorded on the magnetic tape 100.

At that time, the edit information (edit information indicative of edit-in IN) Sh delayed by the delay circuit 22 when the video data of the hundred and fourth frame F104 is input is synthesized with the coded data dv by the synthesizing circuit in the recording-coder 34. The edit information Sh is recorded on the auxiliary track or the above space on the magnetic tape 100.

At the stage that the insert mode edit is finished and the video data Dv of the fifth frame F5 is input, since the supply of the edit information Sh indicative of the edit-out OUT to the input terminal φe is stopped, the detecting circuit 21 supplies the first detecting signal S1 to the switching control circuit 20 and the switching control circuit 20 outputs the first and second control signals P1 and P2, whereby the first switching circuit 17 connects the movable contact 17c to the first fixed contact 17a. The first switching circuit 17 is held in this state during two-frame period. Although the second switching circuit 19 is intended to connect the movable contact 19c to the second fixed contact 19b, the previous switched state is maintained so that the second switching circuit 19 does not switch the movable contact 19c.

As a consequence, the video data Dv of hundred and fifth frame F105 output from the first frame memory 11 is input through the second switching circuit 19 to the data compression processing circuit 2. Intraframe-coded data dvi concerning the hundred and fifth frame F105 is output from the recording unit 3 and the data dvi is recorded on the magnetic tape 100.

At that time, the edit information (edit information indicative of the edit-out OUT) delayed by the delay circuit 22 when video data of the hundred and fifth frame F105 is input is synthesized with the coded data dv by the synthesizing circuit in the recording-coder 34. Then, the edit information is recorded on the auxiliary track or the above space on the magnetic tape 100.

Therefore, the edit information Sh indicative of the edit-out OUT is recorded on the magnetic tape 100 together with the two-way predictive error data dve concerning the hundred and fourth frame F104 and the intraframe-coded data dvi concerning the hundred and fifth frame F105.

A signal processing executed after video data of sixth frame F6 is input is the same (see FIG. 9) as that executed by the encoding apparatus and the operation need not be described herein.

Figure 12:
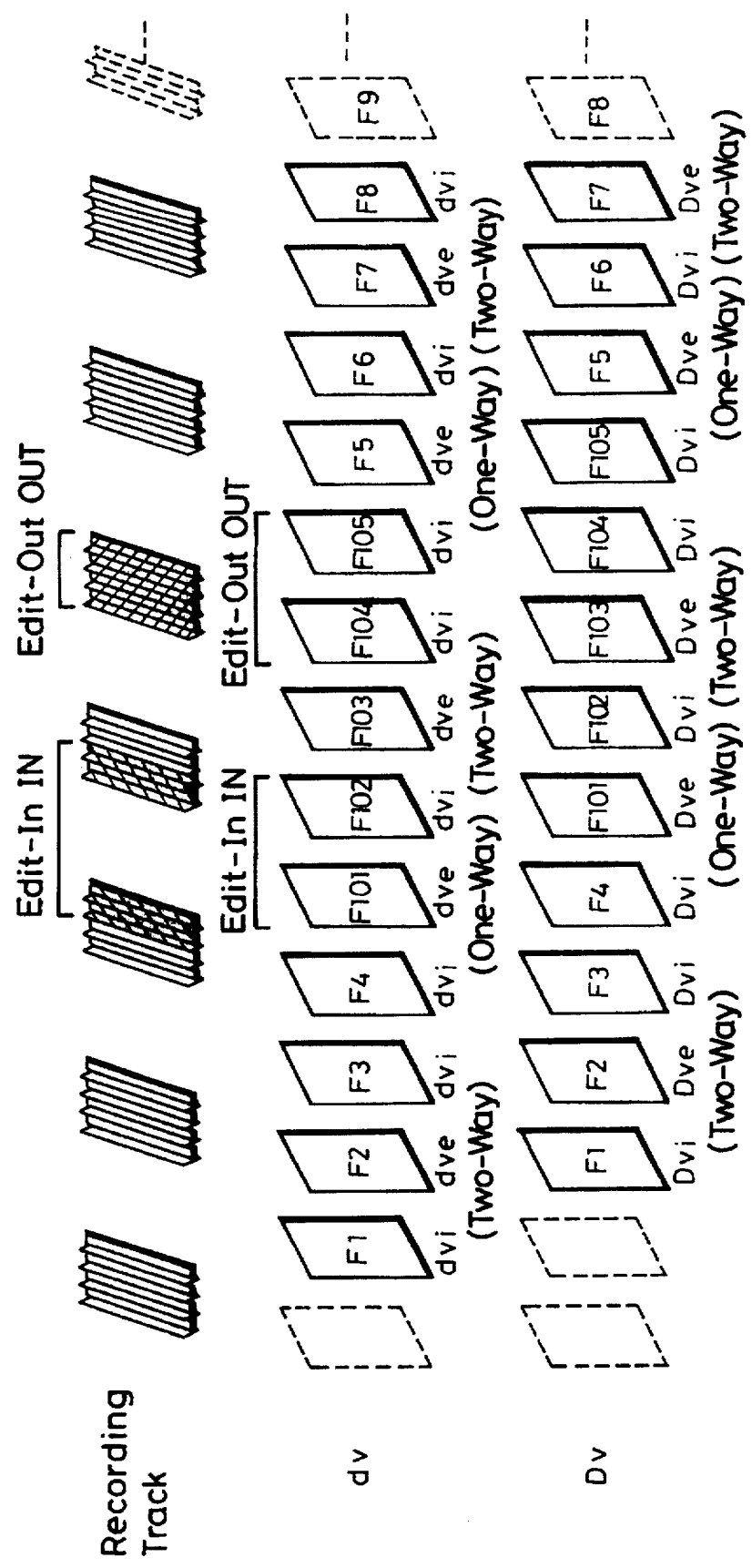
FIG. 12 is an explanatory diagram showing a processing operation executed by the apparatus for decoding information data according to the present invention in insert mode edit ( . . . F3, F4, (F101–F105), F5, F6, . . . )

In the decoding apparatus, as shown in FIG. 12, the stage in which the intraframe-coded data dvi concerning the first frame F1 is reproduced to the stage in which the intraframe-coded data dvi concerning the hundred and fourth frame F104 is reproduced are the same (see FIG. 10) as those executed by the decoding apparatus and the operation thereof need not be described herein.

At the stage that the intraframe-coded data dvi concerning the hundred and fifth frame F105 is reproduced, the switching control circuit 72 outputs the output control signal So based on the vertical sync signal VD detected by the detecting circuit in the recording-decoder 61, whereby the output circuit 54 connects the movable contact 54c to the second fixed contact 54b.

As a result, the output circuit 54 outputs intraframe-coded reproduced data Dvi (reproduced video data) concerning the hundred and fourth frame F104 supplied thereto from the first frame memory 65.

At the stage that the reproduction of data concerning the insert edit is finished and one-way predictive error data dve concerning the fifth frame F5 is reproduced, since the edit information Sh indicative of the edit-out OUT is no more detected by the detecting circuit in the recording-coder 61, the switching control circuit 72 outputs the switching control signal Ss and the output control signal So, whereby the switching circuit 70 connects the movable contact 70c to the first fixed contact 70a. The switching circuit 70 is held in this state during two-frame period. The output circuit 54 connects the movable contact 54c to the second fixed contact 54b during one frame period.

As a result, the output circuit 54 outputs intraframe-coded reproduced data (reproduced video data) Dvi concerning the hundred and fifth frame F105 supplied thereto from the first frame memory 65.

A signal processing executed after intraframe-coded data dvi concerning the sixth frame F6 is the same (see FIG. 10) as that executed by the decoding apparatus and therefore need not be described herein.

Figure 13:
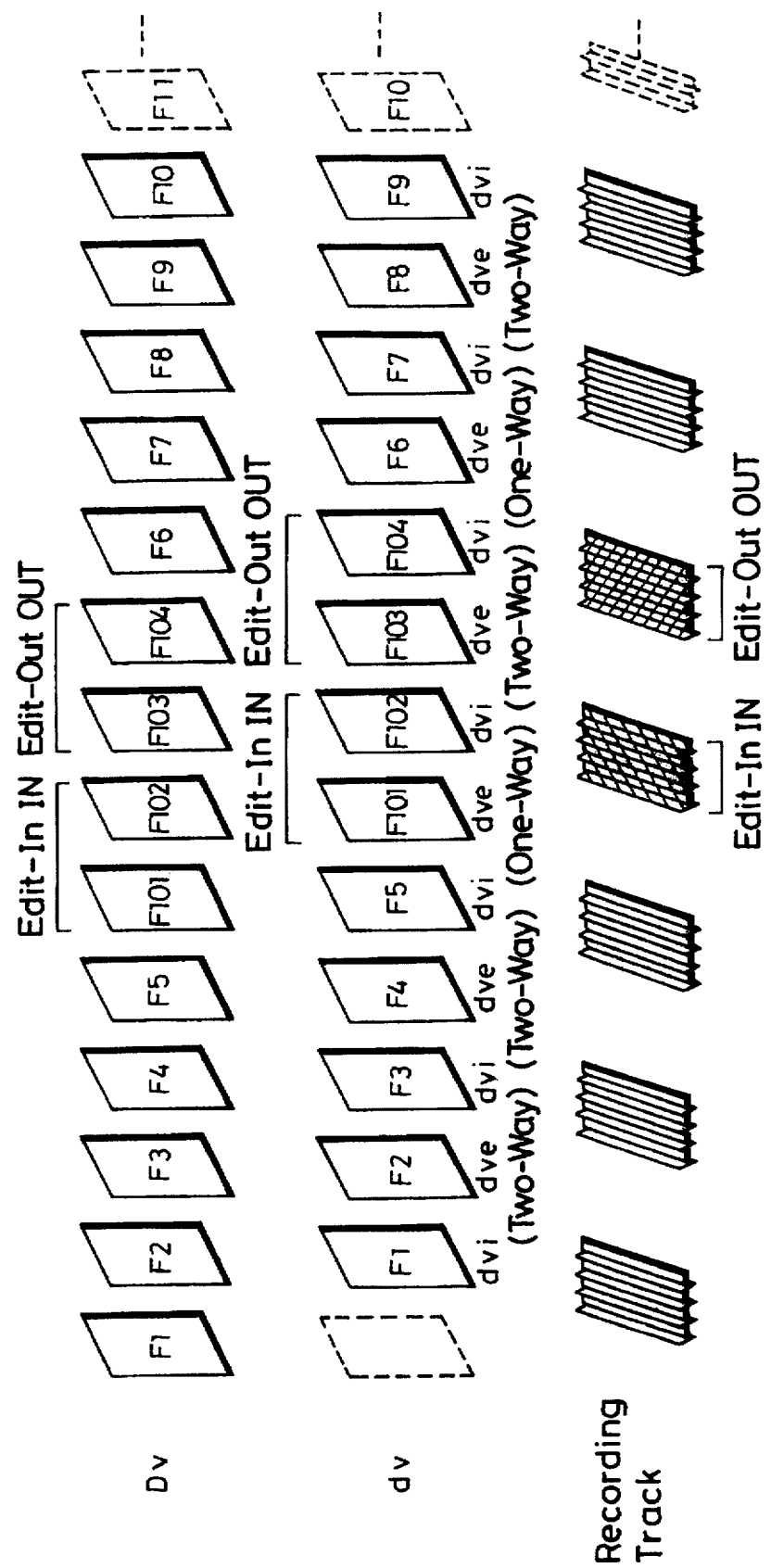
FIG. 13 is an explanatory diagram showing a processing operation executed by the apparatus for coding information data according to the present invention in insert mode edit ( . . . F4, F5, (F101–F104), F6, F7, . . . )

A manner in which other video data of four frames from the frame next to the fifth frame F5 (video data ranging from the hundred and first frame F101 to the hundred and fourth frame F104) is edited in the insert mode edit will be described with reference to FIGS. 13 and 14.

A signal processing executed until the video data Dv of the fifth frame F5 is input after the video data Dv of the first frame F1 has been input is the same as the normal signal processing (see FIG. 3) in the encoding apparatus. Therefore, during the period in which video data of the first frame is input and video data of the fifth frame is input, the recording unit 3 outputs invalid data, intraframe-coded data dvi concerning the first frame F1, two-way predictive error data dve concerning the second frame F2, intraframe-coded data dvi concerning the third frame F3, and two-way predictive error data dve concerning the fourth frame F4, in that order. These data are recorded on the magnetic tape 100.

At the stage that video data Dv of the hundred and first frame F101, which is other video data, is input, when the edit information Sh indicative of the edit-in IN is supplied to the input terminal $\phi$e, the detecting circuit 21 supplies the first detecting signal S1 to the switching control circuit 20 and the switching control circuit 20 outputs the first and second control signals P1 and P2, whereby the first switching circuit 17 connects the movable contact 17c to the first fixed contact 17a. The first switching circuit 17 is held in this state during two-frame period. The second switching circuit 19 connects the movable contact 19c to the second fixed contact 19b.

As a consequence, video data Dv of the fifth frame F5 output from the first frame memory 65 is input through the second switching circuit 19 to the data compression processing circuit 2. Intraframe-coded data dvi concerning the fifth frame F5 is output from the recording unit 3 and the data dvi is recorded on the magnetic tape 100. Furthermore, the edit information Sh indicative of the edit-in IN is delayed by a delay time of one frame period by the delay circuit 22.

At the stage that the video data Dv of the hundred and second frame F102 is input, the switching control circuit 20 outputs the second control signal P2 based on the vertical sync signal VD input thereto from the synchronizing separating circuit, whereby the second switching circuit 19 connects the movable contact 19c to the first fixed contact 19a.

Therefore, one-way predictive error data Dse concerning the hundred and first frame F101 is input through the first and second switching circuits 17 and 19 to the data compression processing circuit 2. Then, the one-way predictive error data Dse is compressed and coded by the data compression processing circuit 2 and output from the recording unit 3 as interframe-coded data dve based on the hundred and first frame F101, thereby being recorded on the magnetic tape 100.

The first motion vector data v1 detected by the motion vector detecting circuit 13 and the edit information (edit information indicative of the edit-in IN) delayed by the delay circuit 22 when the video data of the hundred and first frame F101 is input are synthesized with the coded data dv in the recording-coder 34. The motion vector data v1 and the edit information Sh are recorded on the auxiliary track or the above space on the magnetic tape 100.

At the stage that the video data Dv of the hundred and third frame F103 is input, since the two-frame period is elapsed from the frame in which the edit-in IN is detected (when video data of hundred and first frame F101 is input), the switching control circuit 20 outputs the first control signal P1 to the first switching circuit 17, whereby the first switching circuit 17 connects the movable contact 17c to the second fixed contact 17b. The switching control circuit 20 outputs the second control signal P2 based on the vertical sync signal VD input thereto from the synchronizing separating circuit, whereby the second switching circuit 19 connects the movable contact 19c to the second fixed contact 19b.

As a result, the video data Dv of the hundred and second frame F102 output from the first frame memory 11 is input through the second switching circuit 19 to the data compression processing circuit 2. Intraframe-coded data dvi concerning the hundred and second frame F102 is output from the recording unit and the data dvi is recorded on the magnetic tape 100.

The edit information (edit information indicative of the edit-in IN) delayed by the delay circuit 22 when video data of hundred and second frame F102 is input is synthesized with the coded data dv by the synthesizing circuit in the recording-coder 34. The edit information Sh is recorded on the auxiliary track or the above space on the magnetic tape 100.

The edit information Sh indicative of the edit-in IN is recorded on the magnetic tape 100 together with one-way predictive error data dve concerning the hundred and first frame F101 and intraframe-coded data dvi concerning the hundred and second frame F102.

At the stage that video data Dv of hundred and fourth frame F104 is input, the switching control circuit 20 outputs the second control signal P2 based on the vertical sync signal VD input thereto from the synchronizing separating circuit, whereby the second switching circuit 19 connects the movable contact 19c to the first fixed contact 19a.

Therefore, two-way predictive error data Dte concerning the hundred and third frame F103 is input through the first and second switching circuits 17 and 19 to the data compression processing circuit 2. Then, the two-way predictive error data Dte is compressed and coded by the data compression processing circuit 2 and output from the recording unit 3 as interframe-coded data dve based on the hundred and third frame F103, thereby being recorded on the magnetic tape 100.

The first and second motion vector data v1 and v2 detected by the motion vector detecting circuit 13 and the edit information (edit information indicative of the edit-out OUT) Sh delayed by the delay circuit 22 when video data of hundred and third frame F103 is input are synthesized with the coded data dv by the synthesizing circuit in the recording-coder 34. The motion vector data v1 and v2 and the edit information Sh indicating the edit-out OUT are recorded on the auxiliary track or the above space on the magnetic tape 100.

At the stage that the insert mode edit is finished and video data Dv of the sixth frame F6 is input, since the supply of the edit information indicating the edit-out OUT to the input terminal φe is stopped, the detecting circuit 21 supplies the first detecting signal S1 to the switching control circuit 20 and the switching control circuit 20 outputs the first and second control signals P1 and P2, whereby the first switching circuit 17 connects the movable contact 17c to the first fixed contact 17a. The first switching circuit 17 is held in this state during two-frame period. The second switching circuit 19 connects the movable contact 19c to the second fixed contact 19b.

As a result, the video data Dv concerning the hundred and fourth frame F104 output from the first frame memory 11 is input through the second switching circuit 19 to the data compression processing circuit 2. Intraframe-coded data dvi concerning the hundred and fourth frame F104 is output from the recording unit 3 and the data dvi is recorded on the magnetic tape 100.

Furthermore, the edit information (edit information indicative of the edit-out OUT) Sh delayed by the delay circuit 22 when video data of the hundred and fourth frame F104 is input is synthesized with the coded data dv by the synthesizing circuit in the recording-coder 34. The edit information Sh is recorded on the auxiliary track or the above space on the magnetic tape 100.

Therefore, the edit information indicative of the edit-out OUT is recorded on the magnetic tape 100 together with two-way predictive error data dve concerning the hundred and third frame F103 and intraframe-coded data dvi concerning the hundred and fourth frame F104.

At the stage that the video data Dv of the seventh frame F7 is input, the switching control circuit 20 outputs the second control signal P2 based on the vertical sync signal VD input thereto from the synchronizing separating circuit, whereby the second switching circuit 19 connects the movable contact 19c to the first fixed contact 19a.

As a result, one-way predictive error data Dse concerning the sixth frame F6 is input through the first and second switching circuits 17 and 19 to the data compression processing circuit 2. The one-way predictive error data Dse is compressed and coded by the data compression processing circuit 2 and output from the recording unit 3 as interframe-coded data dve, thereby being recorded on the magnetic tape 100.

Also in this case, the first motion vector data v1 detected by the motion vector detecting circuit 13 is synthesized with the coded data dv by the synthesizing circuit in the recording-coder 34. The motion vector data v1 is recorded on the auxiliary track or the above space on the magnetic tape 100.

At the stage that the video data Dv of the eighth frame F8 is input, since the two-frame period is elapsed from the frame in which the end of the edit-out OUT is detected (when video data of the sixth frame F6 is input), the switching control circuit 20 outputs the first control signal P1 to the first switching circuit 17, whereby the first switching circuit 17 connects the movable contact 17c to the second fixed contact 17b. Further, the switching control circuit 20 outputs the second control signal P2 based on the vertical sync signal VD input thereto from the synchronizing separating circuit, whereby the second switching circuit 19 connects the movable contact 19c to the second fixed contact 19b.

As a result, the video data of the seventh frame F7 output from the first frame memory 11 is input to the data compression processing circuit 2 through the second switching circuit 19. The recording unit 3 outputs intraframe-coded data dvi concerning the seventh frame F7 and the data dvi is recorded on the magnetic tape 100.

At the stage that video data of the ninth frame F9 is input, the switching control circuit 20 outputs the second control signal P2 based on the vertical sync signal VD input thereto from the synchronizing separating circuit, whereby the second switching circuit 19 connects the movable contact 19c to the first fixed contact 19a.

Therefore, two-way predictive error data Dte concerning the eighth frame F8 is input to the data compression processing circuit 2 through the first and second switching circuits 17 and 19. The two-way predictive error data Dte is compressed and coded by the data compression processing circuit 2 and output from the recording unit 3 as interframe-coded data dve based on the eighth frame F8, thereby being recorded on the magnetic tape 100.

The first and second motion vector data v1 and v2 detected by the motion vector detecting circuit 13 are synthesized with the coded data dv by the synthesizing circuit in the recording-coder 34. The motion vector data v1 and v2 are recorded on the auxiliary track or the above space on the magnetic tape 100.

An operation similar to a series of operation executed when the video data Dv of the eighth frame F8 is input and when the video data of the ninth frame F9 is input will hereinafter be repeated sequentially.

Figure 14:
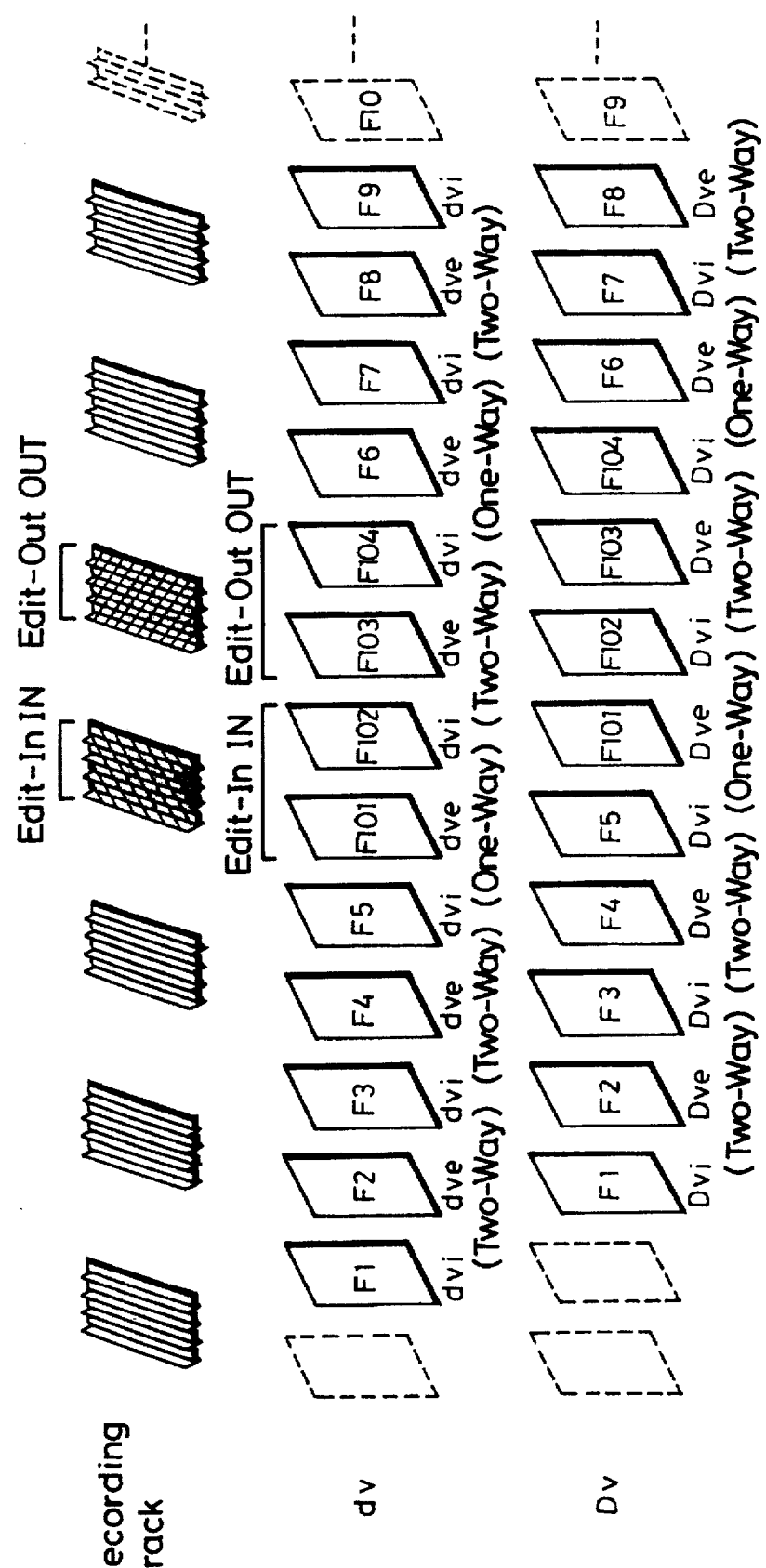
FIG. 14 is an explanatory diagram showing a processing operation executed by the apparatus for decoding information data according to the present invention in insert mode edit ( . . . F4, F5, (F101–F104), F6, F7, . . . )

In the decoding apparatus, as shown in FIG. 14, a signal processing executed until intraframe-coded data dvi concerning the frame (in this case, the fifth frame F5) preceding the frame in which the edit information Sh indicative of the edit-in IN is recorded is reproduced after the intraframe-coded data dvi concerning the first frame F1 has been reproduced is the same as that of the normal decode processing (see FIG. 4). Therefore, during the period in which the intraframe-coded data dvi concerning the first frame F1 is reproduced and intraframe-coded data dvi concerning the fifth frame F5 is reproduced, the output circuit 54 outputs invalid data, intraframe-coded reproduced data (reproduced video data) Dvi concerning the first frame F1, interframe-coded reproduced data (reproduced video data) Dve based on the second frame F2, intraframe-coded reproduced data (reproduced video data) Dvi concerning the third frame F3 and interframe-coded reproduced data (reproduced video data) Dve based on the fourth frame F4, in that order.

At the stage that one-way predictive error data dve concerning the hundred and first frame F101 is reproduced, since the edit information Sh indicative of the edit-in IN is detected by the detecting circuit in the recording-decoder 61, the switching control circuit 72 outputs the switching control signal Ss and the output control signal So, whereby the switching circuit 70 connects the movable contact 70c to the first fixed contact 70a. The switching circuit 70 is held in this state during two-frame period. The output circuit 54 connects the movable contact 54c to the second fixed contact 54b during one-frame period.

As a consequence, the output circuit 54 outputs intraframe-coded reproduced data (reproduced video data) Dvi concerning the fifth frame F5 supplied thereto from the first frame memory 65.

At the stage that intraframe-coded data dvi concerning the hundred and second frame F102 is reproduced, the switching control circuit 72 outputs the output control signal So based on the vertical sync signal VD detected by the detecting circuit in the recording-coder 61, whereby the output circuit 54 connects the movable contact 54c to the first fixed contact 54a.

Therefore, the output circuit 54 outputs interframe-coded reproduced data (reproduced video data) Dve based on the one-way predictive error reproduced data Dse concerning the hundred and first frame F101.

At the stage that two-way predictive error data dve concerning the hundred and third frame F103 is reproduced, since the two-frame period is elapsed from the frame (when video data of the hundred and first frame F101 is reproduced) wherein the edit-in IN is detected, the switching control circuit 72 outputs the switching control signal Ss, whereby the switching circuit 70 connects the movable contact 70c to the second fixed contact 70b. Furthermore, the switching control circuit 72 outputs the output control signal So based on the vertical sync signal VD detected by the detecting circuit in the recording-decoder 61, whereby the output circuit 54 connects the movable contact 54c to the second fixed contact 54b.

As a consequence, the output circuit 54 outputs intraframe-coded reproduced data (reproduced video data) Dvi concerning the hundred and second frame F102 supplied thereto from the first frame memory 65.

At the stage that the intraframe-coded data dvi concerning the hundred and fourth frame F104 is reproduced, the switching control circuit 72 outputs the output control signal So based on the vertical sync signal VD detected by the detecting circuit in the recording-decoder 61, whereby the output circuit 54 connects the movable contact 54c to the first fixed contact 54a.

Therefore, the output circuit 54 outputs interframe-coded reproduced data (reproduced video data) Dve based on the two-way predictive error data of the hundred and third frame F103.

At the stage that the reproduction of data concerning the insert mode edit is ended and one-way predictive error data dve concerning the sixth frame F6 is reproduced, since the edit information indicative of the edit-out OUT is not detected any more by the detecting circuit in the recording-decoder 61, the switching control circuit 72 outputs the switching control signal Ss and the output control signal So, whereby the switching circuit 70 connects the movable contact 70c to the first fixed contact 70a. The switching circuit 70 is held in this state during the two-frame period. The output circuit 54 connects the movable contact 54c to the second fixed contact 54b during the one-frame period.

As a result, the output circuit 54 outputs intraframe-coded reproduced data (reproduced video data) Dvi concerning the hundred and fourth frame F104 supplied thereto from the first frame memory 65.

At the stage that intraframe-coded data dvi concerning the seventh frame F7 is reproduced, the switching control circuit 72 outputs the output control signal So based on the vertical sync signal VD detected by the detecting circuit in the recording-decoder 61, whereby the output circuit 54 connects the movable contact 54c to the first fixed contact 54a.

Therefore, the output circuit 54 outputs interframe-coded reproduced data (reproduced video data) Dve based on the one-way predictive error reproduced data Dse concerning the sixth frame F6 through the switching circuit 70.

At the stage that the two-way predictive error data dve concerning the eighth frame F8 is reproduced, since the two-frame period is elapsed from the frame (when video data of the sixth frame F6 is reproduced) wherein the end of the edit-out OUT is detected, the switching control circuit 72 outputs the switching control signal Ss, whereby the switching circuit connects the movable contact 70c to the second fixed contact 70b. Furthermore, the switching control signal 72 outputs the output control signal So based on the vertical sync signal VD detected by the detecting circuit of the recording-decoder 61, whereby the output circuit 54 connects the movable contact 54c to the second fixed contact 54b.

As a consequence, the output circuit 54 outputs intraframe-coded reproduced data (reproduced video data) Dvi concerning the seventh frame F7 supplied thereto from the first frame memory 65.

At the stage that the intraframe-coded data dvi concerning the ninth frame F9 is reproduced, the switching control circuit 72 outputs the output control signal So based on the vertical sync signal VD detected by the detecting circuit in the recording-decoder 61, whereby the output circuit 54 connects the movable contact 54c to the first fixed contact 54a.

Therefore, the output circuit 54 outputs the interframe-coded reproduced data (reproduced video data) Dve based on the two-way predictive error data concerning the eighth frame F8.

An operation similar to a series of operation executed when the two-way predictive error data dve concerning the eighth frame F8 is reproduced and when the intraframe-coded data dvi concerning the ninth frame F9 will hereinafter be repeated sequentially.

Figure 15:
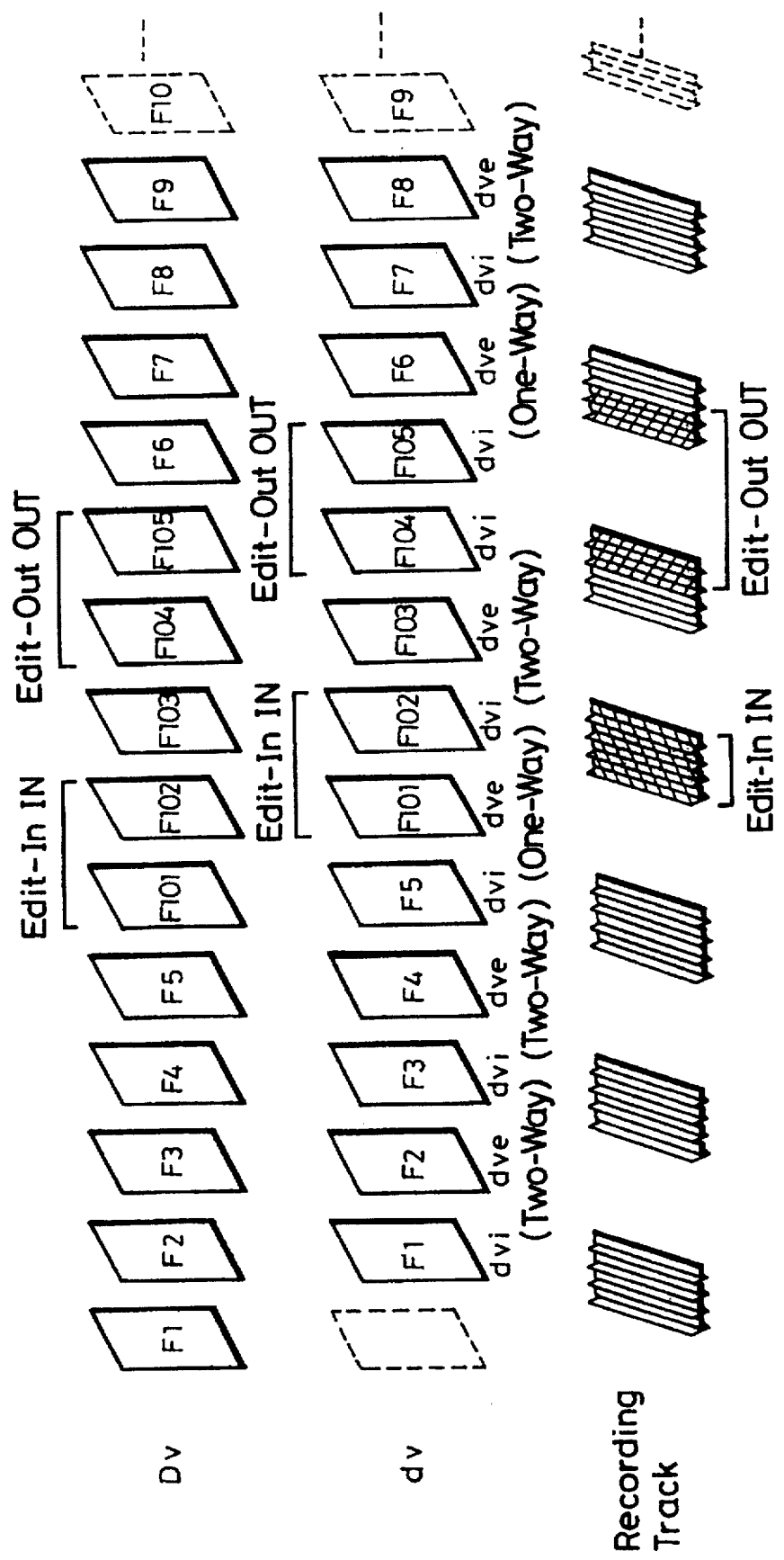
FIG. 15 is an explanatory diagram showing a processing operation executed by the apparatus for coding information data according to the present invention in insert mode edit ( . . . F4, F5, (F101–F105), F6, F7, . . . )

A manner in which other video data (video data ranging from hundred and first frame F101 to hundred and fifth frame F105) are edited from the frame next to the fifth frame F5 in the insert mode edit will be described with reference to FIGS. 15 and 16.

A signal processing executed until video data Dv of hundred and fourth frame F104 is input after the video data Dv of the first frame F1 has been input is the same as the signal processing (see FIG. 13) in the encoding apparatus and therefore need not be described herein.

At the stage that the video data Dv of the hundred and fifth frame F105 is input, the switching control signal P2 outputs the second control signal P2 based on the vertical sync signal VD from the synchronizing separating circuit, whereby the second switching circuit 19 connects the movable contact 19c to the second fixed contact 19b.

As a result, video data Dv of hundred and fourth frame F104 output from the first frame memory 11 is input to the data compression processing circuit 2 through the second switching circuit 19. The recording unit 3 outputs intraframe-coded data dvi concerning hundred and fourth frame F104 and the data dvi is recorded on the magnetic tape 100.

Furthermore, the edit information (edit information indicating the edit-out OUT) Sh delayed by the delay circuit 22 when video data of hundred and fourth frame F104 is input is synthesized with the coded data dv by the synthesizing circuit in the recording-coder 34. The edit information Sh is recorded on the auxiliary track or the above space on the magnetic tape 100.

At the stage that the insert mode edit is ended and the video data Dv of the sixth frame F6 is input, since the supply of the edit information Sh indicating the edit-out OUT to the input terminal φe is stopped, the detecting circuit 21 supplies the first detecting signal S1 to the switching control circuit 20 and the switching control circuit 20 outputs the first and second control signals P1 and P2, whereby the first switching circuit 17 connects the movable contact 17c to the first fixed contact 17a. The first switching circuit 17 is held in this state during two-frame period. Although the second switching circuit 19 is intended to connect the movable contact 19c to the second fixed contact 19b, the previous switched state is maintained so that the second switching circuit 19 does not switch the movable contact 19c.

As a result, video data Dv of hundred and fifth frame F105 output from the first frame memory 11 is input to the data compression processing circuit 2 through the second switching circuit 19. The recording unit 3 outputs intraframe-coded data dvi concerning the hundred and fifth frame F105 and the data dvi is recorded on the magnetic tape 100.

Furthermore, the edit information (edit information indicating the edit-out OUT) Sh delayed by the delay circuit 22 when video data of hundred and fifth frame F105 is input is synthesized with the coded data dv by the synthesizing circuit in the recording-coder 34. The edit information Sh is recorded on the auxiliary track or the above space on the magnetic tape 100.

Therefore, the edit information Sh indicative of the edit-out OUT is recorded on the magnetic tape 100 together with intraframe-coded data dvi concerning the hundred and fourth frame F104 and intraframe-coded data dvi concerning the hundred and fifth frame F105.

A signal processing executed after video data of seventh frame F7 is input is the same (see FIG. 13) as that executed by the encoding apparatus and therefore need not be described herein.

Figure 16:
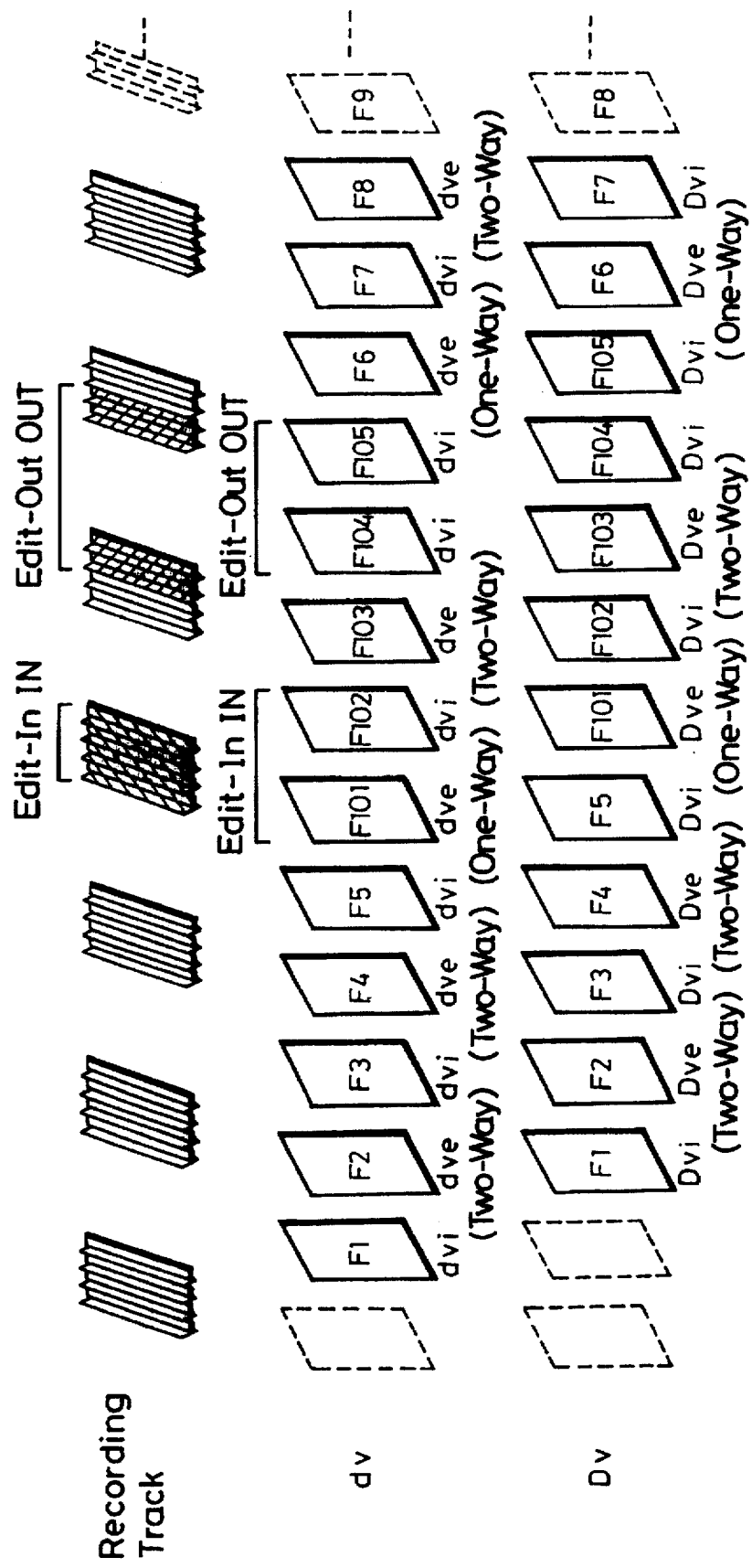
FIG. 16 is an explanatory diagram showing a processing operation executed by the apparatus for decoding information data according to the present invention in insert mode edit ( . . . F4, F5, (F101–F105), F6, F7, . . . ).

In the decoding apparatus, as shown in FIG. 16, a signal processing executed until intraframe-coded data dvi concerning the hundred and fourth frame is reproduced after intraframe-coded data dvi concerning the first frame F1 has been reproduced is the same as that (see FIG. 14) executed by the decoding apparatus and therefore need not be described herein.

At the stage that intraframe-coded data dvi concerning the hundred and fifth frame F105 is reproduced, the switching control circuit 72 outputs the output control signal So based on the vertical sync signal VD detected by the detecting circuit in the recording-decoder 61, whereby the output circuit 54 connects the movable contact 54c to the second fixed contact 54b.

As a result, the output circuit 54 outputs intraframe-coded reproduced data (reproduced video data) Dvi concerning the hundred and fourth frame F104 supplied thereto from the first frame memory 65.

At the stage that the data concerning the insert mode edit is finished and one-way predictive error signal dve concerning the sixth frame F6 is reproduced, since the edit information indicative of the edit-out OUT is not detected any more by the detecting circuit in the recording-decoder 61, the switching control circuit 72 outputs the switching control signal Ss and the output control signal So, whereby the switching circuit 70 connects the movable contact 70c to the first fixed contact 70a. The switching circuit 70 is held in this state during two-frame period. The output circuit 54 connects the movable contact 54c to the second fixed contact 54b during one-frame period.

As a consequence, the output circuit 54 outputs intraframe-coded reproduced data (reproduced video data) Dvi concerning the hundred and fifth frame F105 supplied thereto from the first frame memory 65.

A signal processing executed after the intraframe-coded data dvi concerning the seventh frame F7 has been reproduced is the same as that (see FIG. 14) executed by the decoding apparatus and therefore need not be described herein.

As described above, in the encoding apparatus according to the present invention, the motion compensation processing circuit 1 detects the motion vector data v1 and v2 relative to the input video data Dv. At that time, the first switching circuit 17 is changed in position in response to the control signal P1 output from the switching control circuit 20 on the basis of the first detecting signal S1 from the detecting circuit 21 when the edit information Sh is supplied to the input terminal φe, thereby selectively switching the one-way predictive motion compensation and the two-way predictive motion compensation.

If information with different contents (having almost no correlation with previous input information) is input somewhere of edit due to assemble mode edit or insert mode edit, when the cue of the assemble mode or edit-in IN is supplied to the detecting circuit 21, the detecting circuit 21 outputs the first detecting signal S1. The switching control circuit 20 outputs the first control signal P1 to the first switching circuit 17 on the basis of the first detecting signal S1 input thereto from the detecting circuit 21 during two-frame period. The first switching circuit 17 connects the movable contact 17c to the one-way side, i.e., the first fixed contact 17a based on the first control signal P1 input thereto from the switching control circuit 20. Therefore, the video data at the cue is motion-compensated by the one-way prediction motion compensation.

When the video data Dv other than the above cue is input to the motion compensation processing circuit 1, the content of the edit information Sh indicates that the current input video data Dv is not the cue. Therefore, in this case, under control of the switching control circuit 20 and the first switching circuit 17, the motion compensation is switched to the two-way prediction motion compensation with a high efficiency.

The video data Dv in which the motion compensation is carried out by the one-way prediction motion compensation or the two-way prediction motion compensation in the motion compensation processing circuit is output from the motion compensation processing circuit 1 as the one-way motion compensation prediction data Dsr or the two-way motion compensation prediction data Dt. The motion compensation prediction data Dsr or Dt is supplied to the succeeding subtracter 18, in which the prediction error De (Dse or Dte) between it and the video data Dv supplied thereto from the first frame memory 11 is detected.

The prediction error data De (Dse or Dte) from the subtracter 18 and the video data Dv from the first frame memory 11 are compressed and coded by the succeeding data compression processing circuit 2 as interframe-coded data dve and intraframe-coded data dvi. The data compressing processing circuit 2 adds the motion vector data v1 and v2 detected by the motion vector detecting circuit 13 and the edit information indicating the cue to the coded data dv containing the interframe-coded data dve and the intraframe-coded data dvi.

As described above, according to the coding apparatus of the present invention, since the motion compensation prediction is switched to the one-way prediction and the two-way prediction on the basis of the edit information Sh indicating the cue, the video data Dv corresponding to the cues with substantially no correlation between the frames can be motion-compensated by the one-way prediction motion compensation. Information data with high correlation between the frames can be motion-compensated by the two-way prediction motion compensation with a high coding efficiency.

To raise a coding efficiency, it is proposed to perform a two-way prediction motion compensation with a high coding efficiency uniformly. When information data of frames with substantially no correlation such as the cues are motion-compensated, it takes plenty of time to obtain the motion vector information. Further, since information data of frames have substantially no correlation therebetween, even when the motion vector data are obtained, effect based on motion compensation (effect for raising coding efficiency) cannot be achieved remarkably.

However, according to the coding apparatus of the present invention, as described above, information data of frames with substantially no correlation are not motion-compensated and only information data with a high correlation can be motion-compensated. Furthermore, since the two-way prediction with a high coding efficiency is carried out, moving image data can be edited at the compression unit by use of the two-way motion compensation prediction system with a high efficiency.

Since the one-way motion compensation prediction system is low in coding efficiency as compared with the two-way motion compensation prediction system, if recording data amount (track number) at the unit of 2 frames is constant, then a picture quality is deteriorated. However, according to the present invention, since the one-way motion compensation prediction system is intended to motion-compensate only video data concerning the cue, a deterioration of picture quality becomes inconspicuous and recorded image data can be prevented from being affected substantially perfectly.

In the coding apparatus according to the present invention, since the recording-coder 34 in the data compression processing circuit 2 includes the synthesizing circuit for synthesizing the motion vector data v1, v2 supplied thereto from the motion vector detecting circuit 13 and the edit information Sh indicating the cue supplied to the input terminal φe to the coded data dv, the motion vector data v1 and v2 and the edit information Sh can be added to the coded data dv. As a result, a decoding side can perform a decoding processing by use of the edit information Sh. It can easily be determined whether transmitted coded data dv is motion-compensated by the one-way prediction motion compensation or the two-way prediction motion compensation. Therefore, the coded data dv can be reliably decoded to the video data Dv.

In the decoding apparatus according to the present invention, the detecting circuit in the recording-decoder 61 extracts the motion vector data v1 and v2 from the coded data dv. The data expanding processing circuit 52 decodes the coded data dv to provide the intraframe-coded reproduced data Dvi and the prediction error reproduced data De (Dse or Dte).

Then, the motion compensation processing circuit 53 motion-compensates the prediction error reproduced data De (Dse or Dte) by the one-way prediction motion compensation or the two-way prediction motion compensation based on the intraframe-coded reproduced data Dvi supplied thereto from the data expanding processing circuit 52 and the motion vector data v1 and v2 supplied thereto from the detecting circuit in the recording-decoder 61.

At that time, the one-way prediction motion compensation and the two-way prediction motion compensation are switched based on the edit information Sh supplied from the detecting circuit. If coded information is changed into the intraframe-coded reproduced data Dvi concerning video data Dv whose content is changed in somewhere due to assemble mode edit or insert mode edit executed on the coding side (with substantially no correlation with previous prediction error reproduced data De, when the intraframe-coded reproduced data Dvi (corresponding to the cue) is input to the motion compensation processing circuit 53, a motion compensation prediction is switched to the one-way prediction by the edit information Sh (e.g., information indicating assemble mode edit or information indicating insert mode edit). Then, the motion compensation processing circuit 53 motion-compensates moving image data based on the one-way prediction motion compensation with a relatively low efficiency.

When intraframe-coded reproduced data Dvi concerning video data other than the cue is input to the motion compensation processing circuit 53, the content of the edit information Sh indicates that the current intraframe-coded reproduced data Dvi is not the cue. Therefore, in this case, the motion compensation processing circuit 53 switches the one-way prediction motion compensation to the two-way prediction motion compensation of high efficiency.

Interframe-coded reproduced Dve is obtained on the basis of the motion compensation prediction data (Dsr or Dt) from the motion compensation circuit 53 and the prediction error reproduced data De (Dse or Dte). The output circuit 54 outputs reproduced video data Dv in which the interframe-coded reproduced data Dve and the intraframe-coded reproduced data Dvi are output alternately.

As described above, since the motion compensation prediction is switched to the one-way prediction and the two-way prediction on the basis of the edit information Sh such as the information indicating the cue, the intraframe-coded reproduced data Dvi corresponding to the cue with substantially no correlation with immediately-preceding frame can be motion-compensated by the one-way prediction motion compensation. Information data with a high correlation between the frames can be motion-compensated by the two-way prediction compensation with a low coding efficiency. Specifically, the information decoding apparatus corresponding to the above-mentioned information coding apparatus can be obtained and the compressed information in which information data is edited at the compression unit can be decoded with a high efficiency.

While the present invention is applied to the VCR in which the coded data is recorded on and/or reproduced from the magnetic tape as described above, a principle of the present invention can also be applied to the case that the coded data dv can be recorded on and/or reproduced from a recordable magneto-optical disk serving as a disk-like recording medium instead of the magnetic tape.

In this case, any of a magnetic modulation system and an optical modulation system may be used. When the magnetic modulation system is used, a magnetic generating means (excitation coil) for generating an external magnetic field corresponding to a logical value of the coded data dv and a laser beam irradiating means (optical pickup) for heating a recording layer (vertical magnetization film) of the magneto-optical disk at a temperature in excess of Curie temperature are used as the recording magnetic head in the recording unit 3. The above-mentioned optical pickup can be served also as the reproducing magnetic head in the reproducing unit 51, thereby the magnetic modulation system being realized.

Furthermore, when the optical modulation system is used, the recording magnetic head can be replaced with an excitation coil for generating constant external magnetic field and a laser beam irradiating means (optical pickup) for selectively heating the recording layer (vertical magnetization film) of the magneto-optical disk at a temperature in excess of Curie temperature in response to the logical value of the coded data dv. The reproducing magnetic head can be replaced with the above optical pickup and therefore the optical modulation system can be realized.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. Apparatus for coding information data comprising:
   motion compensating means for compensating motion of moving image data selectively in accordance with one-way prediction or two-way prediction of input information by detecting motion vector information relative to said input information to generate motion compensation information;
   predictive error detecting means for detecting a predictive error between motion compensation information and said input information to generate predictive error information;
   means for coding said predictive error information and said input information to generate coded information containing interframe-coded information and intraframe-coded information; and
   means for receiving edit information, wherein said motion compensating means selects either said one-way prediction or said two-way prediction in response to said edit information and wherein said means for coding adds said edit information to said coded information together with said motion vector information.

2. The apparatus for coding information data according to claim 1, wherein said input information relates to a frame of said moving image data; wherein said motion compensating means includes one-way predicting means for one-way predicting motion compensation of said input information in accordance with frame information succeeding said input information, two-way predicting means for two-way predicting motion compensation of said input information in accordance with frame information succeeding and preceding said input information, and means for selecting motion compensation information from said one-way predicting means or said two-way predicting means in response to said edit information.

3. The apparatus for coding information data according to claim 2, wherein said means for coding includes means compressing said predictive error information and said input information, and means for adding said motion vector information and said edit information to said coded information.

4. Apparatus for decoding information data comprising:
   information extracting means for extracting motion vector data and edit information from compressed information composed of intraframe-coded information and predictive error information;
   means for decoding said compressed information to generate intraframe-coded reproduced information and predictive error reproduced information;
   motion compensation means for selectively one-way-motion compensating or two-way-motion compensating said intraframe-coded reproduced information in accordance with said predictive error reproduced information and said motion vector data to generate interframe-coded reproduced information; and
   means for alternately outputting said interframe-coded reproduced information and said intraframe-coded reproduced information, wherein said motion compensating means selects either one-way prediction or two-way prediction in response to said edit information.

5. The apparatus for decoding information data according to claim 4, wherein said motion compensating means includes one-way motion compensating means for one-way motion-compensating said predictive error reproduced information in accordance with intraframe-coded reproduced information succeeding said predictive error reproduced information, two-way motion compensating means for two-way motion-compensating said predictive error reproduced information in accordance with said intraframe-coded reproduced information succeeding and preceding said predictive error reproduced information, and means for selecting motion compensation information from said one-way motion compensating means or said two-way motion compensating means in response to said edit information.

6. A method of coding information data comprising the steps of:
   (a) compensating motion of moving image data selectively in accordance with one-way prediction or two-way prediction of input information by detecting motion vector information relative to said input information to generate motion compensation information;
   (b) detecting a predictive error between motion compensation information and said input information;

(c) coding predictive error information and said input information to generate coded information containing interframe-coded information and intraframe-coded information; and (d) receiving edit information, wherein said step of compensating motion selects either said one-way prediction or said two-way prediction in response to said edit information and wherein said step of coding adds said edit information to said coded information together with said motion vector information.

7. The method of coding information data according to claim 6, wherein said input information relates to a frame of said moving image data; wherein said step of compensating motion includes the steps of one-way predicting motion compensation of said input information in accordance with frame information succeeding said input information, two-way predicting motion compensation of said input information in accordance with frame information succeeding and preceding said input information, and selecting motion compensation information from said step of one-way predicting or said step of two-way predicting in response to said edit information.

8. The method of coding information data according to claim 7, wherein said step of coding includes the steps of compressing said predictive error information and said input information, and adding said motion vector information and said edit information to said coded information.

9. A method of decoding information data comprising the steps of:

extracting motion vector data and edit information from compressed information composed of intraframe-coded information and predictive error information;

(b) decoding said compressed information to generate intraframe-coded reproduced information and predictive error reproduced information;

(c) selectively compensating by one-way-motion compensating or two-way-motion compensating said intraframe-coded reproduced information in accordance with said predictive error reproduced information and said motion vector data to generate interframe-coded reproduced information; and (d) alternately outputting said interframe-coded reproduced information and said intraframe-coded reproduced information, wherein said step of selectively compensating selects either one-way prediction or two-way prediction in response to said edit information.

10. The method of decoding information data according to claim 9, wherein said step of selectively compensating includes the steps of one-way motion-compensating said predictive error reproduced information in accordance with said intraframe-coded reproduced information succeeding said predictive error reproduced information, two-way motion-compensating said predictive error reproduced information in accordance with intraframe-coded reproduced information succeeding and preceding said predictive error reproduced information, and selecting motion compensation information from said step of one-way motion compensating or said step of two-way motion compensating in response to said edit information.

* * * * *